US007523185B1

(12) United States Patent
Ng et al.

(10) Patent No.: US 7,523,185 B1
(45) Date of Patent: Apr. 21, 2009

(54) METHOD AND APPARATUS FOR PROVIDING AUTOMATIC FRAME RELAY AND ATM PROVISIONING OF NETWORK DEVICES

(75) Inventors: John Ng, Fremont, CA (US); Gregory A. Fowler, Mountain View, CA (US); Arnold L. Stamler, Sunnyvale, CA (US); Antony Richards, Rose Bay (AU); Sairaj Pakkam, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 10/757,809

(22) Filed: Jan. 13, 2004

(51) Int. Cl.
*G06F 15/173* (2006.01)
(52) U.S. Cl. ............... 709/223; 709/238; 370/395.2
(58) Field of Classification Search ............... None
See application file for complete search history.

(56) References Cited

U.S. PATENT DOCUMENTS

| 5,050,070 | A | | 9/1991 | Chastain et al. |
|---|---|---|---|---|
| 5,150,464 | A | | 9/1992 | Sidhu et al. |
| 5,274,771 | A | | 12/1993 | Hamilton et al. |
| 5,351,040 | A | | 9/1994 | Matsuura et al. |
| 5,594,717 | A | * | 1/1997 | Watanabe et al. ......... 370/232 |
| 5,778,323 | A | | 7/1998 | Dorenbosch et al. |
| 5,948,077 | A | | 9/1999 | Choi et al. |
| 5,999,975 | A | | 12/1999 | Kittaka et al. |
| 6,240,165 | B1 | | 5/2001 | Yano et al. |
| 6,363,423 | B1 | | 3/2002 | Chiles et al. |
| 6,363,499 | B1 | | 3/2002 | Delo et al. |
| 6,430,541 | B1 | | 8/2002 | Brown et al. |
| 6,438,749 | B1 | | 8/2002 | Chamberlain |

(Continued)

FOREIGN PATENT DOCUMENTS

WO  WO99/041937  *  8/1999

(Continued)

OTHER PUBLICATIONS

OpenROUTE Networks, Inc.; "Using the ARP and Inverse ARP Protocols;" Copyright 1998, OpenROUTE Networks, Inc.; pp. 1-8.*

(Continued)

*Primary Examiner*—William C Vaughn, Jr.
*Assistant Examiner*—Thomas Richardson
(74) *Attorney, Agent, or Firm*—Hickman Palermo Truong & Becker LLP

(57) ABSTRACT

A method is disclosed for automatically provisioning network devices for use with virtual circuit networks, such as frame relay and ATM networks. The device receives a list of identifiers corresponding to virtual circuits from a configuration interface for the virtual circuit network. The device iteratively applies each identifier from the list to individual instances of interface configuration commands and attempts to provide connectivity with a remote device. Once a configuration command is applied, the device will obtain an IP address for a device terminating the virtual circuit corresponding to the identifier selected from the list; and determines an IP address for itself. The device tests the virtual circuit for connectivity with the remote device. If the device is able to determine that the virtual circuit corresponding to the selected identifier provides connectivity to the remote device, then that virtual circuit is used to connect to the remote device.

38 Claims, 13 Drawing Sheets

U.S. PATENT DOCUMENTS

| | | | |
|---|---|---|---|
| 6,523,070 | B1 | 2/2003 | Stapleton et al. |
| 6,546,425 | B1* | 4/2003 | Hanson et al. ............. 709/227 |
| 6,587,827 | B1 | 7/2003 | Hennig et al. |
| 6,647,510 | B1 | 11/2003 | Ganesh et al. |
| 6,654,726 | B1 | 11/2003 | Hanzek |
| 6,707,820 | B1* | 3/2004 | Arndt et al. ............. 370/395.2 |
| 6,714,972 | B1* | 3/2004 | Lee et al. .................... 709/220 |
| 6,725,033 | B2 | 4/2004 | Holmes |
| 6,769,074 | B2 | 7/2004 | Vaitzblit |
| 6,826,611 | B1* | 11/2004 | Arndt ......................... 709/226 |
| 6,882,626 | B1* | 4/2005 | Marathe et al. .......... 370/241.1 |
| 6,907,602 | B2 | 6/2005 | Tsai et al. |
| 6,981,047 | B2* | 12/2005 | Hanson et al. ............. 709/227 |
| 7,017,155 | B2 | 3/2006 | Peev et al. |
| 7,136,645 | B2* | 11/2006 | Hanson et al. ........... 455/435.1 |
| 7,142,530 | B1* | 11/2006 | Chewning et al. ........... 370/351 |
| 7,155,497 | B2 | 12/2006 | Grover et al. |
| 7,185,113 | B1* | 2/2007 | Haberman et al. .......... 709/250 |
| 7,221,675 | B2* | 5/2007 | Bryden et al. ............... 370/392 |
| 7,230,949 | B2* | 6/2007 | Bharali et al. ........... 370/395.2 |
| 7,243,160 | B2* | 7/2007 | Brahmaroutu .............. 709/238 |
| 2002/0001307 | A1 | 1/2002 | Nguyen et al. |
| 2002/0040389 | A1* | 4/2002 | Gerba et al. ................ 709/219 |
| 2002/0133573 | A1 | 9/2002 | Matsuda et al. |
| 2002/0150108 | A1* | 10/2002 | Nattkemper et al. ........ 370/397 |
| 2003/0009752 | A1 | 1/2003 | Gupta |
| 2003/0061315 | A1 | 3/2003 | Jin |
| 2003/0061320 | A1 | 3/2003 | Grover et al. |
| 2003/0078999 | A1* | 4/2003 | Lund et al. .................. 709/220 |
| 2003/0108039 | A1 | 6/2003 | Shell et al. |
| 2003/0108051 | A1* | 6/2003 | Bryden et al. .......... 370/395.54 |
| 2003/0121033 | A1 | 6/2003 | Peev et al. |
| 2004/0019665 | A1 | 1/2004 | Liang et al. |
| 2005/0193103 | A1* | 9/2005 | Drabik ....................... 709/221 |

FOREIGN PATENT DOCUMENTS

| | | |
|---|---|---|
| WO | WO 2006/010952 A2 | 2/2006 |

OTHER PUBLICATIONS

Comer, Douglas E.; "Computer Networks and Internets;" Copyright 1997, Prentce Hall, Inc.; p. 255.*

U.S. Appl. No. 10/422,227, Arnold Stamler, et al., "Method and Apparatus Providing Automatic Connection Announcement From A Modular Network Device To A Network Management Point," filed Apr. 23, 2003.

U.S. Appl. No. 10/422,231, Arnold Stamler, "Method and Apparatus For Automatically Synchronizing A Unique Identifier Of A Network Device," filed Apr. 23, 2003.

U.S. Appl. No. 10/434,586, Arnold Stamler, et al., "Method and Apparatus Providing Automatic Provisioning Of Modular Network Devices," filed Apr. 23, 2003.

"Frame Relay Fast Packet Switching," Fram Relay Tutorial, Sangoma Technologies, Inc., http://www.sangoma.com, Nov. 8, 1999, pp. 1-3.

T. Bradley, et al., "Inverse Address Resolution Protocol," The Internet Society, Sep. 1998, pp. 1-10.

Cisco Systems, Inc., "Simple Network-Enabled Auto-Provisioning for Cisco IAD2420 Series IADs," undated, pp. 1-26.

Nortel Networks, "Passport 6400 Express Manager," Product Brief, 2000, pp. 1-4.

Netility Corporation, "Products and Technology Overview," http://www.netility.com/pasover.html, printed Sep. 2, 2003, pp. 1-2.

Netility Corporation, "3400 Business Gateway Product Overview," http://www.netility.com/3400_overview.html, printed Sep. 2, 2003, pp. 1-4.

Netility Corporation, "Netility Announces First Auto-Configuring G.SHDSL CPE," Dec. 11, 2001, http://www.netility.com/3400_pr.html, printed Sep. 2, 2003, pp. 1-2.

Netility Corporation, "Frequently Asked Questions," http://www.netility.com/faq.html, printed Sep. 2, 2003, pp. 1-3.

Netility Corporation, "Products/Solutions Overview," http://www.netility.com/3100_overview.html, printed Sep. 2, 2003, pp. 1-2.

Netility Corporation, "3100 Product Overview," undated, 3 pages.

Netility Corporation, "Network Access Device User's Guide, Model 3100," Jun. 5, 2001, pp. 1-64.

Netility Corporation, "Netility Redefines SDSL Deployment with First Auto-Configuring CPE," Oct. 1, 2001, http://www.netility.com/3100_pr.html, printed Sep. 2, 2003, pp. 1-2.

Netility Corporation, "Netility Technology Overview," http://www.netility.com/technology_overview.html, printed Sep. 2, 2003, 1 page.

Netility Corporation, "Netility Configuration System," http://www.netility.com/nc.html, printed Sep. 2, 2003, 1 page.

Netility Corporation, "Netility Makes Patent-Pending Auto-Configuration and Auto-Update Technology Available for Licensing," http://www.netility.com/technology-licensing_pr.html, printed Sep. 2, 2203, pp. 1-2.

Cisco Systems, Inc., "Programmable Network Solutions, Business and Operational Challenges," White Paper, 1992-2002, pp. 1-7.

Cisco Systems, Inc., "Sigma and Cisco Systems Service Fulfillment Offering for Advanced IP Services," 1992-2001, pp. 1-6.

The Gale Group, "Summagraphics Introduces New Tablet Driver", News Release, p. 1, Mar. 19, 1990, Summagraphics Corporation.

* cited by examiner

METHOD AND APPARATUS FOR PROVIDING AUTOMATIC FRAME RELAY AND ATM PROVISIONING OF NETWORK DEVICES

CROSS-REFERENCE TO RELATED APPLICATIONS

This application is related to the following commonly-owned, co-pending U.S. patent applications, the entire contents of which is hereby incorporated by reference as if fully set forth herein:

(a) U.S. patent application Ser. No. 10/422,227, entitled, "Method And Apparatus Providing Automatic Connection Announcement From A Modular Network Device To A Network Management Point," by Arnold Stamler and Ikramullah Mohammed, filed Apr. 23, 2003;

(b) U.S. patent application Ser. No. 10/422,231, entitled, "Method And Apparatus For Automatically Synchronizing A Unique Identifier Of A Network Device", by Arnold Stamler, filed Apr. 23, 2003; and (c) U.S. patent application Ser. No. 10/434,586, entitled, "Method And Apparatus Providing Automatic Provisioning Of Modular Network Devices", by Arnold Stamler and Ikramullah Mohammed, filed May 8, 2003.

FIELD OF THE INVENTION

The present invention generally relates to deploying network devices. The invention relates more specifically to a method and apparatus providing automatic provisioning for modular network devices across heterogeneous network boundaries.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Frame Relay refers to a packet-switching protocol for connecting devices in a network. Frame Relay is becoming more popular, in part because it is a relatively economical and high throughput environment. Presently, frame relay networks in the United States support data transfer rates at T-1 (1.544 Mbps) and T-3 (45 Mbps) speeds, enabling many service providers to utilize existing T-1 and T-3 lines to provide network services. Another network technology, Asynchronous Transfer Mode (ATM), uses fixed size cells or packets to transfer data. By using a small, constant cell size, ATM equipment is able to transmit video, audio, and computer data over the same network, without any single type of data taking up a large amount of the available bandwidth of the line. In general, subscribers to network services that are provided by a service provider use a network device, such as a router or gateway, to connect a personal computer or other end station to the service provider's network and obtain service.

Automatic network configuration provisioning systems are now available for use in generating and downloading sets of configuration instructions, or configuration files, for network devices that are deployed in the field to subscribers of services provided by service providers. It is desirable to be able to perform such provisioning automatically, without requiring a subscriber to manually enter configuration commands, and without requiring a technician associated with a network service provider to visit the subscriber and configure the device.

In one example approach, a vendor manufactures customer premises equipment (CPE) network devices, and "drop-ships" the CPEs to the premises of subscribers of a network service provider. The CPEs are shipped with a generic bootstrap configuration that is copied from or generated at the vendor based on a standard template or format specified by the service provider. When a subscriber installs and powers-up a CPE, under control of the bootstrap configuration the CPE uses an interface specified in the bootstrap configuration to contact a configuration server associated with the service provider. The configuration server downloads a permanent, application-specific configuration to the CPE, which executes the received configuration and begins normal operation.

In network environments in which frame relay and ATM technologies are present, however, the technique of using a generic bootstrap configuration is presented with new issues. The Datalink Connection Identifier (DLCI) number corresponding to a network Persistent Virtual Circuit (PVC) is unique per interface presented to a given customer premises and is insignificant and independent of the DLCI name space used on other interfaces presented to other customer premises. The choice of DLCI number presented to a given customer premises is technically arbitrary, dependant on the choice of service provider and its internal policies.

Using a fixed preset DLCI in any generic bootstrap configuration, for example, would fail in instances where such devices must establish connectivity across multiple regions or service providers using disparate DLCI numbering conventions. In such situations, the DLCI number presented to CPE devices in the customer premises is heterogeneous throughout the network and there cannot be any assumption made about its value with respect to what is encoded in the bootstrap configuration. In frame relay networks, for example, packets are routed through one or more permanent virtual circuits (PVCs), which may be identified using different DLCIs. Since each DLCI is a permanently configured switching path to a particular destination, a system may have more than one DLCI configured. The appropriate DLCI for any particular connection varies between branch offices as well. Accordingly, in such applications, merely shipping a CPE with a generic configuration having therein, a preset DLCI would not address the problem sufficiently in all cases. Therefore, to date, there has been no way to automate the configuration of network devices with templates.

Based on the foregoing, there is a clear need for an approach for automatically provisioning network devices for use in environments, characterized by heterogeneous network technologies.

There is a specific need for an approach that can deliver a consistent configuration to a variety of devices, including modular devices, for use with a variety of network technologies.

There is also a particular need for an automated configuration approach that is compatible with drop shipment practices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
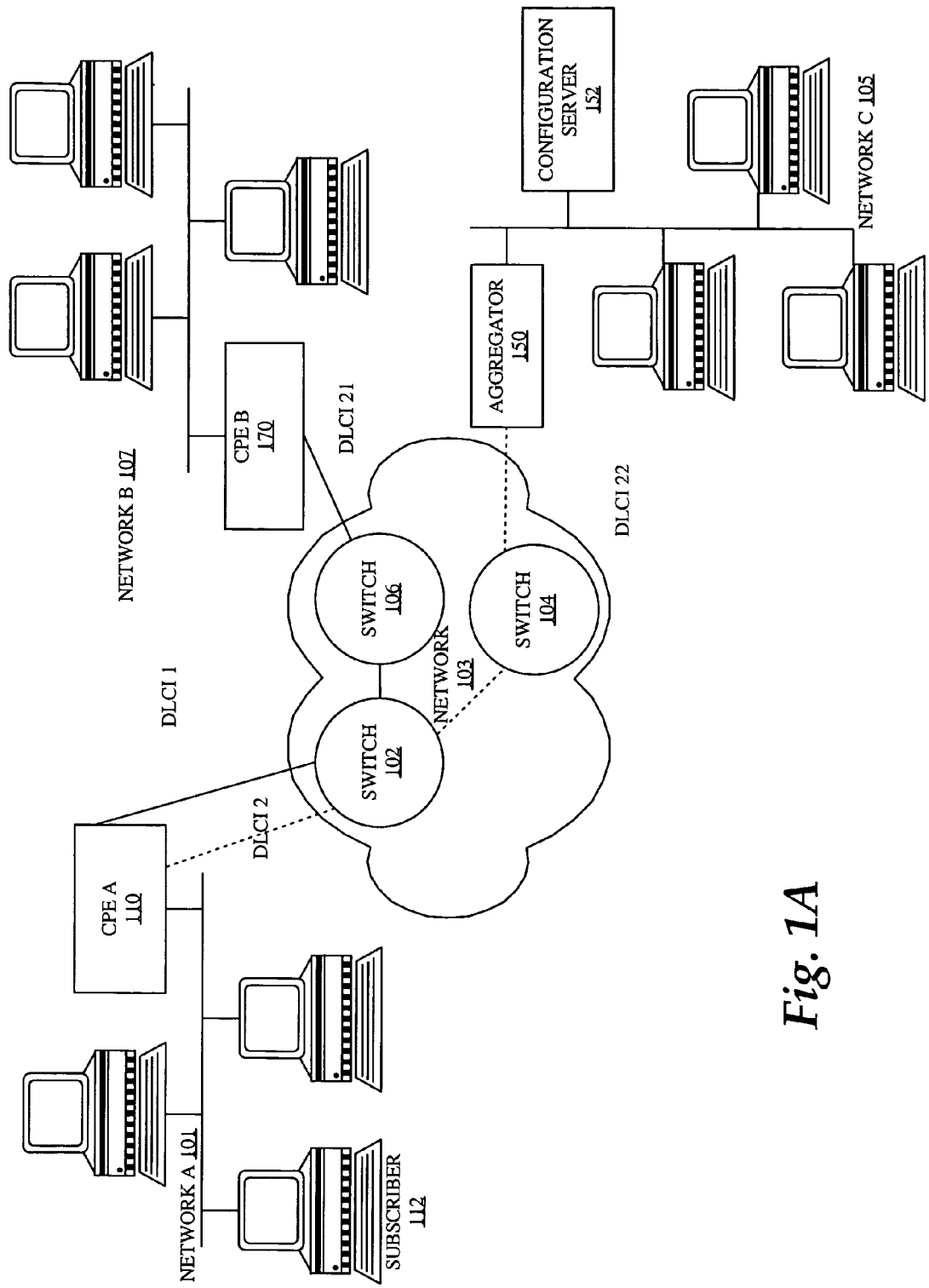
FIG. 1A is a block diagram depicting a network context in which an automatic provisioning system may be used.

A method and apparatus for automating frame relay and ATM provisioning of network devices is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Automating Frame Relay and ATM Provisioning of a Network Device
   3.1 Overview
   3.2 Obtaining and Processing a List of Active DLCIs
   3.3 Obtaining an IP Address for the Device Terminating the Virtual Circuit
   3.4 Determining an IP Address and a Suitable Netmask for the Device
   3.5 Establishing Connectivity with a Configuration Server
   3.6 Generating an Application Specific Configuration
4.0 Implementation Mechanisms—Hardware Overview one
5.0 Extensions and Alternatives

1.0 GENERAL OVERVIEW

The needs identified in the foregoing Background, and other needs and objects that will become apparent for the following description, are achieved in the present invention, which comprises, in one aspect, a method for automatically provisioning network devices for use with virtual circuit networks, such as frame relay and ATM networks. The device receives a list of identifiers corresponding to virtual circuits from a configuration interface for the virtual circuit network. The device iteratively applies each identifier from the list to individual instances of interface configuration commands and attempts to provide connectivity with a remote device. Once a configuration command is applied, the device will obtain an IP address for a device terminating the virtual circuit corresponding to the identifier selected from the list; and determines an IP address for itself. In one embodiment, the device terminating the virtual circuit is remotely located from the device, however, in other embodiments, the two devices may be proximately located to one anther. The device tests the virtual circuit for connectivity with the remote device. If the device is able to determine that the virtual circuit corresponding to the selected identifier provides connectivity to the remote device, then that virtual circuit is used to connect to the remote device.

The identifiers may comprise DLCIs for virtual circuits in frame relay networks, or VCIs for virtual channels in ATM networks. In one embodiment, the virtual circuit network comprises a frame relay network. The device receives a list of Data Link Connection Identifiers (DLCIs) corresponding to virtual circuits active in the network as a Local Management Interface (LMI) message received by the device from the configuration interface for the frame relay network.

In another embodiment, the virtual circuit network comprises an Asynchronous Transfer Method (ATM) relay network. The device receives a list of Virtual Channel Identifiers or Virtual Path Identifiers (VCI/VPI) in the network as a message from an Interim Local Management Interface (ILMI).

In one aspect of the invention, a new command is provided which iteratively incorporates successive virtual circuit identifiers from the list into dynamically constructed commands to configure an interface to the virtual circuit network. The commands may be dynamically constructed and applied to a device interface in order to automatically configure the interface to work with a virtual circuit network, for example, by iteratively selecting identifiers for virtual circuits made available to the device by the network interface point, establishing addressability to a device terminating the virtual circuit corresponding to be selected identifier, and then testing for conductivity in the virtual circuit.

In one embodiment, the device establishes addressability by obtaining an IP address for the device terminating the virtual circuit corresponding to the selected identifier for use in communication across the virtual circuit network by forming an Inverse Address Resolution Protocol Request (IARP) and sending the IARP request to the device terminating the virtual circuit. The device terminating the virtual circuit will receive the request and reply with its IP address. The device receives the reply from the device terminating the virtual circuit, thereby enabling the device to have addressability to the device terminating the virtual circuit. In many typical implementations, the device terminating the virtual circuit is a router, gateway, aggregator or other device providing connectivity to other systems in other networks.

In one embodiment, the device determines an IP address for itself based upon the IP address of a device terminating the virtual circuit. The device chooses a netmask so that the subnet for the device is smaller than or equal to a subnet of the device terminating the virtual circuit. In one embodiment, the device chooses a netmask by picking a "proposed" netmask and testing whether the IP address of the device terminating the virtual circuit is valid under the proposed netmask. If IP address of the device terminating the virtual circuit is not valid under the proposed netmask, another proposed netmask is tried until one that works is found. Then, the device determines a valid IP address for the subnet of the device. In one embodiment, the device chooses an IP address by adding or subtracting 1 to the IP address of the device terminating the virtual circuit. In one embodiment, the device tests the result to determine if the result is a valid address in the subnet of the device. The device does not choose the IP address of the device terminating the virtual circuit.

In another aspect of the invention, the device determines a netmask and IP address for itself based upon a selection criterion, which in one embodiment, specifies that an IP address is considered valid for a given netmask if the IP address is neither the broadcast address nor the network ID address. Using C notation, this is given by the following Boolean expression being TRUE:

$$((ip\_address\_of\_the\_device\_terminating\_the\_VC\ \&\ \sim netmask)\ !=0)\ \&\&$$

$$((ip\_address\_of\_the\_device\_terminating\_the\_VC\ |\ netmask)\ !=\sim 0) \qquad (1)$$

In one embodiment, the device determines a suitable netmask for itself based upon a selection criterion, which in one embodiment, specifies that the subnet for the device is to be selected to have a smaller or equal subnet range than that of the subnet range of the remote device. For embodiments using IP version 4, the device determines a suitable netmask by finding the largest netmask less than or equal to 30 bits (255.255.255.252) such that the IP address of the device terminating the VC is valid for the given netmask, as discussed above with reference to equation (1).

In one embodiment, if the netmask is required to be less than 24 bits, the device determines that it cannot find a suitable netmask. In another embodiment, if the number of bits in the netmask is less than that required for the class of the IP address of the device terminating the virtual circuit, the device determines that it cannot find a suitable netmask. In a further embodiment, all netmasks are considered valid.

In one embodiment, a local IP address may be calculated (using IP version 4 notation) by adding 0.0.0.1 to the IP address of the device terminating the virtual circuit. Call this value the first result. If the first result is a valid address for the subnet of the device, which may be determined using the approach described herein above in one embodiment, then the device chooses the first result as the IP address for the interface of the device. Otherwise the device subtracts 0.0.0.1 from the IP address of the device terminating the virtual circuit. Call this value the second result. The device chooses the second result as the IP address for the interface of the device. In one embodiment using IP version 6, the device chooses an address using a technique analogous to that described above using IP version 4 notation (i.e., the device address is computed by adding or subtracting one from the address of the device terminating the virtual circuit and testing for a valid result).

Once addressability to the device terminating the virtual circuit is established, the device tests the virtual circuit corresponding to an identifier selected from the list for connectivity with the configuration server via the virtual circuit using a ping message that is sent to the configuration server, which will be routed by the virtual circuit in specific embodiments.

If the ping message is successful, then the device has established conductivity with the device terminating the virtual circuit. In this case, the DLCI for the virtual circuit is selected as the DLCI for reaching the device terminating the virtual circuit and any device is accessible via the device terminating the virtual circuit. If the ping message is not successful, then the device selects the next DLCI in the list and iteratively performs the establishing addressability and testing steps described above using the next DLCI until connectivity is established. If the list of active DLCIs becomes exhausted, without having established connectivity, then the device so indicates in the form of an error message to the user and/or waits for some period of time and tries again.

In another aspect of the invention, once connectivity is established, the device automatically communicates an inventory of all interfaces associated with the device to the remote device upon establishing connectivity with the remote device. In one embodiment, the device includes a generic startup configuration placed on the device; the configuration comprises commands for configuring interfaces on the device. At the device, each interface on the device is configured with commands associated with the interface, including interfaces using frame relay or ATM networks. The device then attempts to connect with a configuration server through the current interface using the techniques described herein. If the current interface can connect to the configuration server, then the device and the configuration server exchange information regarding the configuration of the device.

In other aspects, the invention encompasses a computer apparatus and a computer-readable medium configured to carry out the foregoing steps.

2.0 STRUCTURAL AND FUNCTIONAL OVERVIEW

FIG. 1A is a block diagram depicting a representative network environment in which the method for automatic provisioning network devices for use with virtual circuit networks may be embodied. As shown in FIG. 1A, a device CPE A 110 is installed by the IT administrator of a Network A 101 in order to connect Network A 101 to another network, such as network 103, which may any type of virtual circuit network, such as a frame relay or ATM network, for example.

When the CPE A 110 is installed, it is communicatively coupled to a switch 102 of network 103 to establish a physical connection. A network interface subsystem (not shown) of network 103 provides the CPE A device 110 with a list of identifiers corresponding to virtual circuits available to CPE A 110 in the network 103. If network 103 is a frame relay network, the list of identifiers comprises a list of DLCIs. If network 103 is an ATM network the list of identifiers comprises a list of VCI/VPIs. The CPE A device 110 is capable of discovering a path through network 103 to an aggregator 150, which terminates one of the active virtual circuits in the network 103 accessible to CPE A 110. Aggregator 150 is coupled to a network C 105. In the embodiment illustrated by FIG. 1A, a configuration server 152 is communicatively coupled to network C 105, however, in select specific embodiments, configuration server 152 may not be on the same network as aggregator 150, but may be reachable via one or more networks communicatively coupling aggregator 150 and configuration server 152. Configuration server 152 comprises configuration information, which may be exchanged with CPE A 110 in order to configure the device. The ability to automatically configure a remotely installed device, such as CPE A 110 provided by one embodiment will be discussed in further detail below.

As can be seen from FIG. 1A, a path may be established from CPE A 110 to aggregator 150 via switch 102 and switch 104 forming a virtual circuit in network 103. Further, once CPE A 110 has established connectivity with aggregator 150, it is also possible then to access configuration server 152.

Once a customer installs CPE A 110 in network A 101, the CPE A 110 is presented with a plurality of active virtual circuits in network 103 in the form of an LMI message comprising a list of active DLCIs for a frame relay network or an ILMI message comprising a list of active VCI/VPIs for an ATM network. FIG. 1A indicates a virtual circuit identifier DLCI1 and another virtual circuit identifier DLCI2 are accessible to CPE A 110 via switch 102 of network 103. FIG. 1A also indicates that a virtual circuit identifier DLCI21 is accessible to CPE B 170 via switch 106 of network 103, and that a virtual circuit identifier DLCI 22 is accessible to aggregator 150 via switch 104 of network 103. DLCIs are specific to a particular location. Because the path from CPE A 110 to aggregator 150 is provided by the virtual circuit network 103, the identifiers of a particular active virtual circuit cannot simply be hard coded into the configuration of CPE A 110 and shipped with CPE A 110. This is because the path from CPE A 110 to aggregator 150 is known by a different DLCI at different points with a network 103.

In one embodiment, CPE A 110 comprises a hardware identifier that is assigned to CPE A 110 by a manufacturer. The manufacturer may assign any sequence of characters as the hardware identifier. For example, these characters may include, but are not limited to, alphanumeric and special characters such as "@", "#", "$", "%", "*".

According to one embodiment, a serial number associated with some component of CPE A 110, such as its chassis or CPU, is used as the hardware identifier. The CPE A 110 may acquire its hardware identifier using any of several mechanisms, including self-discovery. Examples of identifier values that CPE A 110 may "self-discover" and assign to hardware identifier, include, but are not limited to, the chassis serial number or the MAC address. According to another embodiment, the hardware identifier may be manually inputted into CPE A 110 as part of manufacturing or an initial configuration process.

CPE A 110 further comprises a unique identifier that uniquely identifies CPE A 110. For example, the value "xyz" may be assigned as the unique identifier for CPE A 110 whereas the value "abc" may be assigned as the unique identifier for a different device. In contrast to hardware identifier, the unique identifier is changeable when CPE A 110 is in operation. Configuration commands may instruct CPE A 110 to adopt its hardware identifier as its unique identifier, or to adopt some other value as its unique identifier.

At the time of manufacturing, CPE A 110 is configured with an installed configuration. The installed configuration may include commands for changing the value of the unique identifier. CPE A 110 includes an operating system, among other things, for executing commands associated with the installed configuration.

According to one embodiment, operating system includes an inventory reporting agent comprising instructions which, when executed by CPE A 110, cause the device to self-initiate a report of its internal inventory of line cards and interfaces to a configuration server 152 of a service provider or the like. The service provider may use an automated configuration system, for example, to communicate the configuration that is to be used as the installed configuration for a particular installed device, such as CPE A 110. According to one embodiment, the configuration system is Configuration Express as provided by Cisco Systems, Inc., San Jose, Calif. The service provider communicates a generic configuration to a vendor through the configuration system. According to one embodiment, a generic configuration loaded as the installed configuration of CPE A 110 when manufacturing of CPE A 110 is complete is used to bootstrap the CPE A 110 upon installation and startup in order to establish connectivity with the configuration server 152.

According to one embodiment, the generic configuration comprises a bootstrap configuration. The generic configuration contains instructions which, when executed by CPE A 110, enable the device to determine which of several line cards or interfaces in the device can communicate through network 103 to configuration server 152.

According to one embodiment, a configuration template is a partially complete configuration that is to become the installed configuration for CPE A 110. For example, the configuration template may contain commands or parameter values that are specific to an operating environment or business environment of subscriber 112. Further, the configuration template contains one or more substitution strings for which values derived from an actual inventory of CPE A 110 are substituted before the configuration is provided to the device.

In an embodiment, the final or application-specific configuration is created based on populating the configuration template with values derived from an inventory report received from the device. According to one embodiment, configuration template contains one or more substitution strings, which acts as a placeholder or marker that specifies a location for substituting in a value that is obtained from an inventory report received from CPE A 110. In one embodiment, the configuration template is processed by substituting inventory values to create a final configuration, which is downloaded to CPE A 110 and becomes the installed configuration. Substitution strings may be used for substituting any desired parameter value into a configuration template.

According to one embodiment, the configuration server 152 creates and transmits a final configuration based on a configuration template to the CPE A 110. According to one embodiment, configuration server 152 creates the final configuration based upon a configuration template when the CPE A device 110 connects to the configuration server 152 via a virtual circuit in network 103 and requests a configuration. According to one embodiment, the configuration server 152 is a Cisco CNS 2100 Series Intelligence Engine ("IE 2100"), from Cisco Systems, Inc. According to one embodiment, one or more management point systems (not shown in FIG. 1A) are systems that are interested in CPE A device 110, its inventory, or information that it generates, which may be present in one or more of Networks A 101, B 107 or C 105. Examples of management point systems include, but are not limited to, billing systems, provisioning systems, and fault detection systems.

Figure 1B:
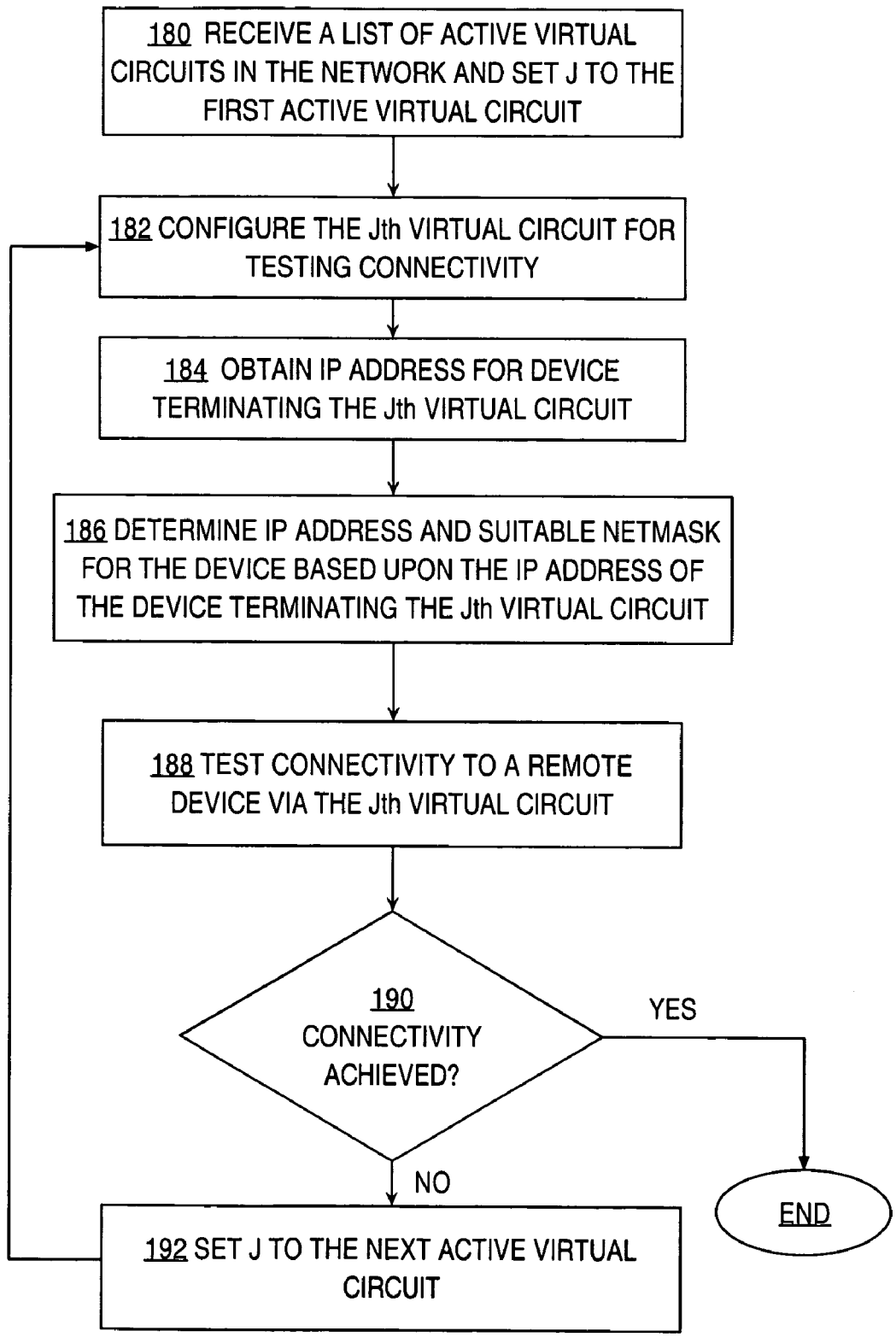
FIG. 1B is a flow diagram showing a high level overview of a process for automatically provisioning a device in a virtual circuit network environment in one embodiment.

FIG. 1B is a flow diagram showing a high level overview of a process for automatically provisioning a network device to operate with virtual circuit networks.

In block 180, the device receives a list of identifiers corresponding to virtual circuits from a configuration interface for the virtual circuit network. Details of example identifiers for specific types of virtual circuit based networks are described below. In general, a device being configured for use with a frame relay network, for example, will need to establish connectivity with a device terminating the virtual circuit corresponding to the DLCI of the device. The device terminating the virtual circuit may be a router, gateway or the like, but in one embodiment is an aggregator.

In block 182, the device begins an iterative process of selecting and testing virtual circuits corresponding to identifiers from the list to try to establish connectivity with a device terminating the virtual circuit which may provide connectivity to other devices in other networks.

In block 184, the device obtains an IP address for the device terminating the virtual circuit. In a specific embodiment, an Inverse Address Resolution Protocol (IARP) is used to obtain an IP address for the device terminating the virtual circuit for the DLCI through which connectivity is sought. While FIG. 1B shows an embodiment that uses IP addresses for device addressing, other embodiments may use other forms of network addresses now known or invented hereafter.

In block 186, the IP address for the device terminating the virtual circuit has been established by block 184, and accordingly, the device chooses an IP address for itself based upon the IP address of the device terminating the virtual circuit. A number of implementation specific techniques can be used to select an IP address. Accordingly, an example of one technique will be described below.

In block 188, a ping or ICMP message is used to test connectivity with a remote device via the device terminating the virtual circuit of the selected DLCI. If the virtual circuit corresponding to the selected identifier provides connectivity to the remote device, then the DLCI is selected and processing completes. The remote device may be configuration server 152 of FIG. 1A in one embodiment.

In block 190, the device tests to see if the ping results were successful. If the ping was successful, then the processing is complete. Otherwise, in block 192, the next virtual circuit is selected and the processing iterates with the processing of block 182.

3.0 METHOD OF AUTOMATICALLY PROVISIONING NETWORK DEVICES FOR USE WITH FRAME RELAY AND ATM NETWORKS

3.1 Overview

According to one embodiment, automatically provisioning devices operable with internet protocol (IP) in a virtual circuit network is facilitated by configuration commands that can instruct the device to connect to a configuration server using a frame relay or ATM network without specifying connection information, such as an identity of the virtual circuit or IP address to use for the connection.

In one embodiment compatible with the Cisco CLI command syntax, new commands, "cns connect" and "cns template connect" are introduced so that individual instances of active virtual circuits in the virtual circuit network, corresponding to identifiers provided by a message from the network interface subsystem can be queried. The new configuration command "cns connect" forms part of the command-line interface (CLI) of a network device operating system. The cns connect command enables the device to connect to a configuration server without having to specify an interface number or slot, only an interface prefix. In one embodiment, the cns connect command instructs the device to connect to a configuration server termed "cns" using any available interface matching the specified prefix.

While certain embodiments herein are described in terms of the Cisco CLI command language syntax, other functionally equivalent embodiments may be provided for other command languages or syntax.

Upon executing the specified configuration command, a device will succeed in connecting to a device terminating a virtual circuit in the virtual circuit switched network. The device terminating the virtual circuit provides connectivity to among others a configuration server. In one embodiment, this command is stored in a startup configuration of the device. When the device reboots, the cns connect command causes the device to iterate through all interfaces in the device that have the same prefix type.

When the cns connect command configures a frame relay interface, the device will wait for a list of DLCI identifiers, corresponding to virtual circuits available in the network, to be received from the network interface subsystem. In frame relay networks, the DLCI identifiers are received in a Local Management Interface (LMI) status message. The device uses the list of active DLCIs in the LMI message to discover its interface IP address by formulating further CLI commands to configure the network interface, as will be described in further detail below.

For each frame relay interface, a well-formed "interface" CLI command is internally built and applied dynamically using a newly invented "discover dlci" command that is applied to each DLCI identifier from the returned list of DLCIs in the LMI message. The cns connect command will internally apply the templates specified after the "discover dlci" command to a sub-interface associated with the interface configured for Frame Relay. The templates specify the CLI to apply, and are defined by the "cns template connect" CLI command. The "cns template connect" has the subcommand "cli" that defines the commands that are applied to the router.

Thereafter, the device obtains an IP address of the device terminating the virtual circuit identified by the DLCI. In one embodiment, Inverse Address Resolution Protocol (IARP) is used to enable the device to request a protocol address corresponding to the DLCI of the terminating device. Inverse ARP enables a frame relay device that has the DLCI associated with an established virtual circuit (VC) to obtain a corresponding internet protocol (IP) address for a device on the other side of the connection. To do this, the requesting device formats an IARP request by inserting its own hardware address, source protocol address and unknown target hardware address into the request, encapsulates the request into a packet for the specific network and then sends the packet directly to the target device. Upon receiving an IARP request, the receiving device formats a response using the source address from the request has the target address of the response, and places its IP address into the source address field of the response. The receiving device then encapsulates the response into a packet for the network and sends the packet to the requesting device. In one embodiment, because the device does not have an IP (source) address configured at the point in time that an IARP request is appropriate, an arbitrary value is used for the source address so that the receiving side does not discard the request because of a zero value present in the source address field of the IARP request.

An suitable netmask is selected for the device. An suitable netmask assures that packets are correctly routed for all IP addresses. Selecting the netmask of the device so that the terminating device's subnet is equal to or larger than that of the device ensures that if the device IP address is valid within the subnet of the device, the device IP address will be valid within the subnet of the device terminating the virtual circuit also. In one embodiment, this criterion can be met by the device selecting a netmask so that the subnet of the device is smaller than or equal to the subnet of the device terminating the virtual circuit. In one implementation, the device begins with the smallest subnet available, corresponding to a netmask of 30 bits (expressed as e.g. 255.255.255.252), and tests to see if the IP address of the device terminating the virtual circuit is valid IP address in this subnet. In other words, the device tests whether the IP address of the device terminating the virtual circuit is neither the network ID or the broadcast address for the chosen subnet. If this criterion is met, then this netmask is selected as the netmask of the device. Otherwise, the device tries with the next smallest subnet (i.e., a netmask of 29 bits) and again tests whether the IP address of the device terminating the virtual circuit satisfies is a valid IP address in this subnet. When a netmask is found in which that IP address of the device terminating the virtual circuit is valid, then that netmask is chosen as the netmask for the device. In this way, the resulting netmask produces a subnet for the device that is equal to or smaller than the subnet of the device terminating the virtual circuit.

The device configures its own IP address for use with the IP address of the device terminating the virtual circuit over the frame relay network. The device is able to choose its own IP address subject to the following criteria: 1) the IP address of the device and the IP address of the device terminating the virtual circuit must be in the respective subnets used at each end; and 2) each IP address must be valid for use in the subnet used at the IP address' end. In other words, neither IP address can be the network ID or broadcast address for its subnet. In one embodiment, the first condition may be satisfied by adding or subtracting 1 to the IP address of the device terminating the virtual circuit. In a specific embodiment using IP version 4, adding or subtracting 1 is equivalent to adding or subtracting 0.0.0.1. In select specific embodiments using IP version 6, adding or subtracting 1 to the IP address of the device terminating the virtual circuit may be used to satisfy the first condition.

The device sends an inquiry, such as a "ping," to the configuration server via the virtual circuit of the DLCI under test and waits for a response. If the ping succeeds, then the DLCI being tested is selected and control passes to the invoking routine.

If no response is received within a specified timeout period, then the device has failed to establish connectivity to the configuration server over the DLCI under test. Accordingly, if the ping fails, the last CLI command is removed and the new CLI configuration command is formed based upon the next DLCI in the list and applied. This process continues until the configuration server is successfully pinged or there are no further DLCIs left in the list. If there are no more DLCIs left in the list, and connectivity has not been established, the interface is restored to its original state and another interface is selected and the configuration process proceeds with the newly selected interface.

Subsequent to establishing connectivity through a virtual circuit to the terminating device, the device may connect with the configuration server via the virtual circuit. The device may present to the configuration server its device unique identifier so that the two devices can exchange configuration information. In one embodiment, the device may specify a line card inventory, module inventory, and chassis slot number insertion point for each module in the device. The inventory may be provided in an inventory message in that conforms to XML format, for example. The inventory message reports, by device product-number, the slot chassis location of each module.

Based on the device's unique identifier and the various product numbers reported in the inventory message, the configuration server locates a matching configuration template in a device information repository. For example, in one embodiment, the configuration server searches a directory or other repository for pre-defined CLI templates for the main chassis configuration and a sub-configuration for each module.

The configuration server then processes the configuration templates into application-specific templates for the device. In an embodiment, the configuration server substitutes the actual slot numbers from the inventory message into slot number parameters of the templates. Thus, non-specific slot identifiers in the templates are resolved into slot-specific, subscriber-specific configuration commands that match the true module and slot hardware configuration of the device. The configuration server returns the application-specific configuration to the device. The device invokes a command parser and applies the final configuration.

In one embodiment, device functions of the foregoing process may be implemented using a dedicated agent that runs under control of the network device operating system. In one specific embodiment, a CNS agent of Cisco IOS is modified to implement the functions described herein, and the configuration server is the Cisco IE2100.

A bootstrap configuration for the device may be specified by a service provider as part of an online order for one or more devices. In one embodiment, the service provider could use an automated tool, such as "Config Express," an existing web-based service that is integrated with an order entry system, such as the Cisco Connection Online order entry system. Using Config Express, the service provider specifies a general subscriber non-specific bootstrap configuration intended to provide connectivity to the configuration server. The manufacturer then applies this configuration to all the devices of that order in a totally automated manufacturing step.

When the foregoing process is integrated with an automated order entry and configuration system, the process provides an extended end-to-end electronic business solution that inter-relates and provides for initial subscriber order-entry; manufacturing; shipping; final device provisioning; and subscriber billing.

3.2 Obtaining and Processing a List of Active DLCIs

A process of automatically determining, through self-discovery, a communication path to a configuration server, and storing a configuration that retains knowledge of the discovery. In the approach herein, a pre-configured bootstrap configuration includes the "cns connect" command in the startup configuration. A new command, discover dlci is to be introduced as a sub command of the cns connect command so that a list of the identifiers for active virtual circuits in the network can be obtained. In one embodiment, by operation of the cns connect, cns template connect, and discover dlci commands, a connection interface agent successively tries to obtain an IP address for each active DLCI in the LMI list and tests the virtual circuit for connectivity to a device on the other end of the virtual circuit.

In the present approach, configuration commands of the form cns template connect encap-frame cli encapsulation frame exit cns connect sample discover interface <interface_type> template encap-frame are provided. For example, a bootstrap configuration may have the command "cns template connect encap-frame," followed by a "cli encapsulation frame" command. In response to executing the "cns template connect encap-frame" command, the device self-discovers all frame encapsulated interfaces available in all line cards and modules. For each particular interface, the device determines the correct syntax for referencing that interface. Further, the device internally builds a well-formed command for the particular interface, and attempts to configure the particular interface by applying the sub-commands to it.

The "cli encapsulation frame" command sets the interface to use frame relay encapsulation, allowing LMI messages to be received. It is called once per interface.

In frame relay networks, the list of identifiers for active virtual circuits in the network is provided by the network interface subsystem in the form of an Local Management Interface (LMI) message. In ATM networks, the list of identifiers is provided by the network interface subsystem in an Interim Local Management Interface (ILMI) message. In one embodiment, establishing a connection through a frame relay network, the network interface subsystem provides the list of active virtual circuits in an LMI command responsive to the device processing a "cns connect" and the "cli encapsulation frame" commands for configuring an interface for frame relay. In one embodiment, the cns connect command is modified to include a wait for an LMI message to be returned from the network interface subsystem.

A new discover dlci command, of the form:
   [no] discover dlci [subinterface <number>]
is provided. When an discover dlci is specified in the configuration, the device will iterate through all DLCIs in an LMI message for the number of seconds specified in <second> before the iterate command will return with failure. A timeout for completion of the discover dlci command may be specified using a command syntax, [no] cns connect <name> . . . [timeout <seconds>] in one embodiment. When not specified, a value of 120 seconds is used for the timeout. The discover dlci command is preferably configured to occur after the interface has been configured for frame relay. This provides an opportunity for the LMI message to be received. All the config-cli lines after the iterate command will be applied (and un-applied) for each active DLCI. A configuration command that uses a value for the DLCI is preferably configured to occur after the discover dlci command.

If configured after the discover dlci command, the following command would be executed for each active DLCI in the LMI message:
   template frame-ip-address
   cli ip address dynamic
   cli frame-ready interface-dlci ${dlci}
   exit
in order to test each DLCI for connectivity. The config-cli command lines are then applied with each of the active DLCI. In one embodiment, a variable called ${dlci} is used to hold the current DLCI. If a timeout occurs, the command is treated as having failed. Accordingly, the command interface agent, connected-intf, continues with the next (cns connect command, interface) pair.

An additional new command informs the device that an IP address for a particular device is to be discovered in the event that frame relay encapsulation is being used. This command has the format:
   ip address discovered Another new command, the discover controller command is a sub-command of cns connect command that enables iteration over controllers. The syntax as is follows:
   discover controller <prefix>

In the discover controller command, the argument <prefix> indicates a prefix for the controller type, for example T1, E1 and the like.

In one embodiment, variables may be used with my above commands in order to provide additional capability to the configuration commands. These variables include:
   ${interface}: the current interface name.
   ${dlci}: the current DLCI.
   ${line}: the current line name
   ${controller}: the current controller name
   ${next-hop}: the next hop to use for the IP packets. Currently equal to ${interface} unless "discover dlci" has been configured, in which case it is equal to ${interface}.sub_interface_number.

The typical use of the ${next-hop} variable is to allow the customer to configure a route to the configuration server, for example, via a device terminating the virtual circuit. As noted previously, the use of the variable called ${dlci} is to hold the current DLCI.

The insertion of a card into the router can be ignored because it will be detected the next time the cns connect function is activated. However, the removal of the card that the discover dlci is enquiring about results in a suitable response, such as an immediate failure return, a timeout or the like.

In one embodiment, the cns connect command tests if the interface's protocol is active (i.e., that the interface is communicatively coupled with the network). If the interfaces protocol is not active, it uses the existing registry function that provides a notification when an interface's protocol has become active. Once the protocol is active (that is, the interface has received LMI messages indicating that LMI has declared the line to be active), an API may be used to determine the list of active DLCI.

Figure 2A:
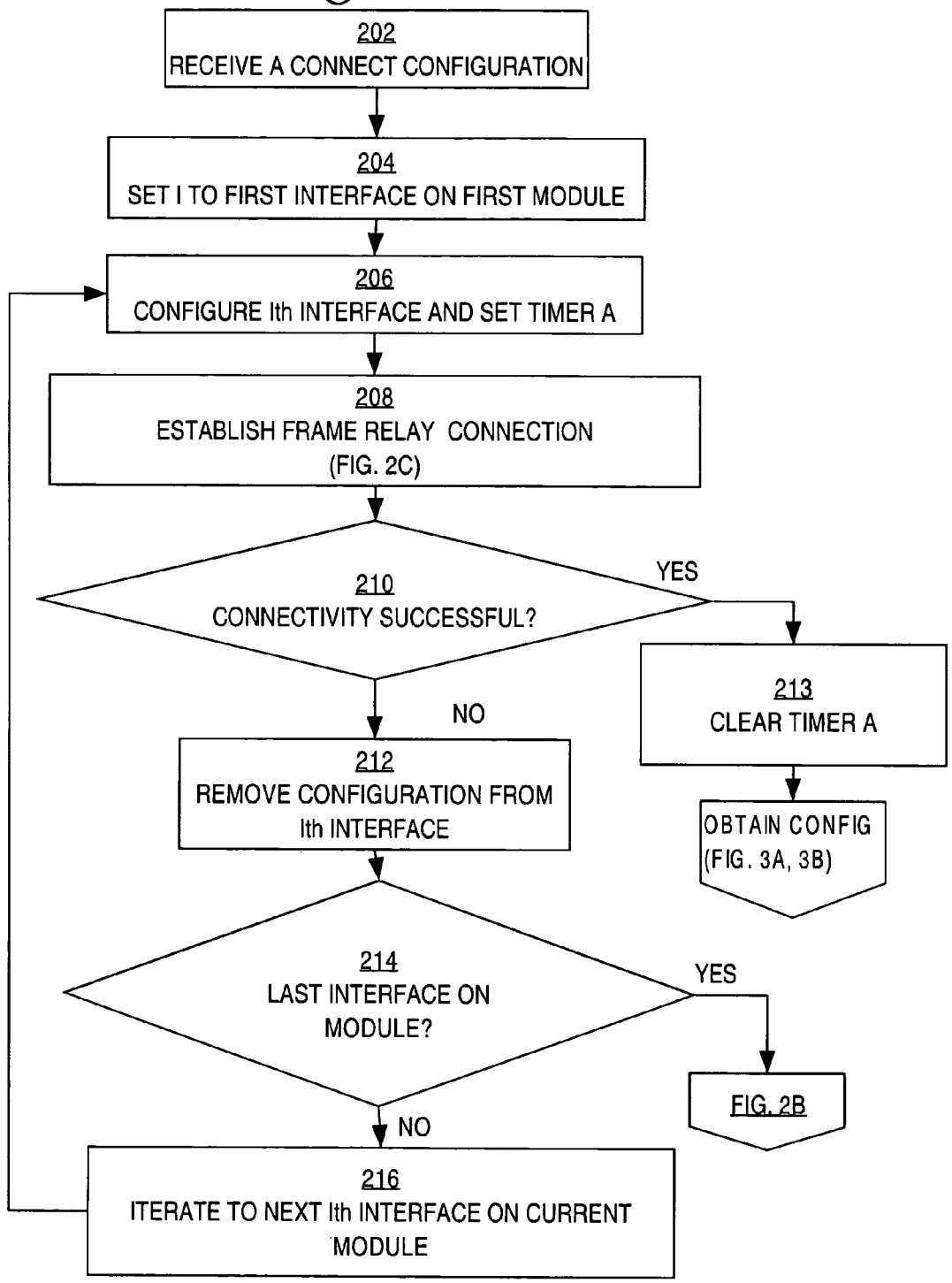
FIGS. 2A-2H are flow diagrams that illustrates a high level overview of one embodiment of a method for establishing connectivity to a device in a virtual circuit network environment.
Figure 2B:
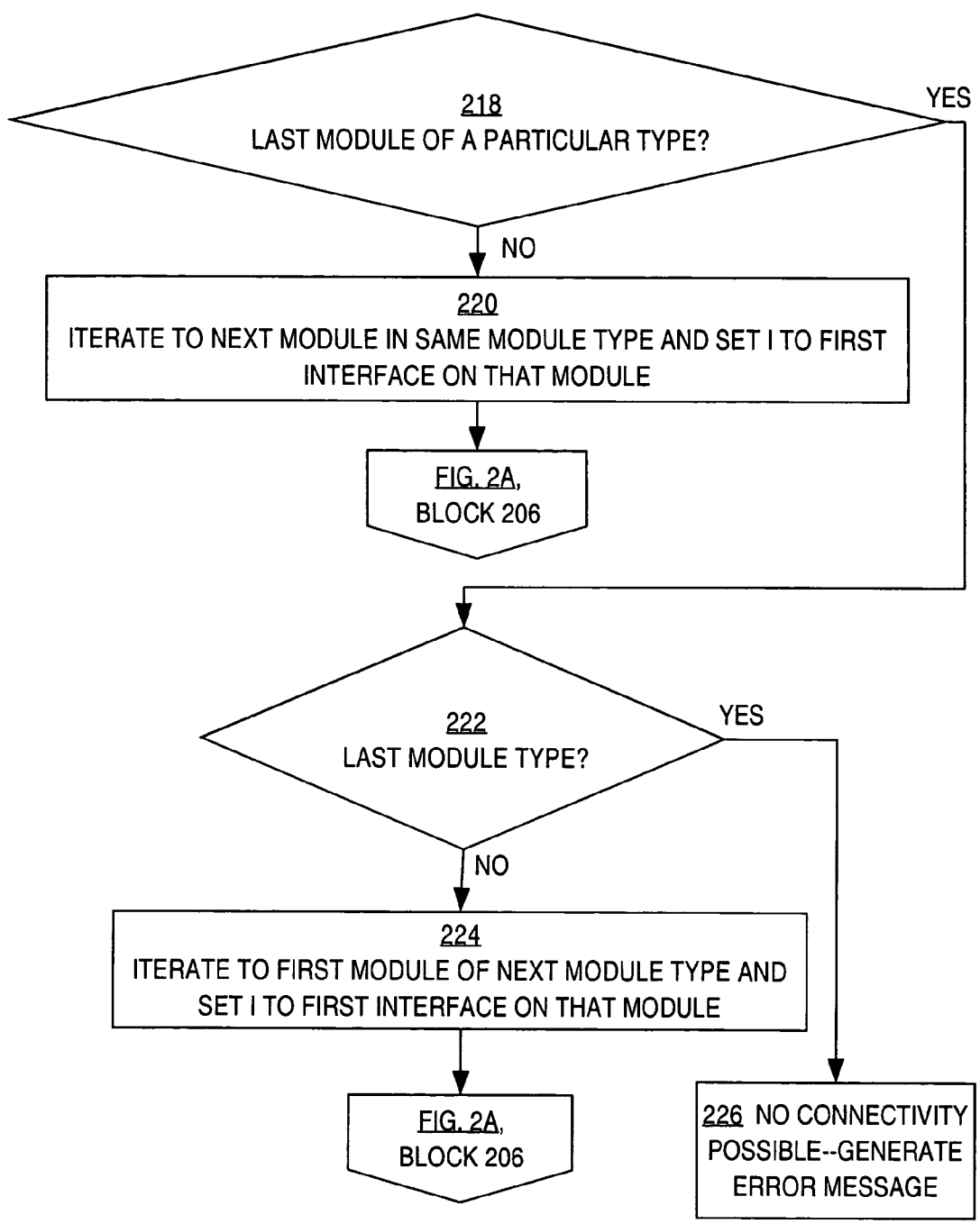

FIG. 2A is a flow diagram that illustrates a high level overview of one embodiment of a method for identifying an interface that can connect to a configuration server over a virtual circuit network. FIG. 2B is a flow diagram that illustrates further steps in the method of FIG. 2A.

Referring first to FIG. 2A, in block 202, a connection configuration is received. For example, a device receives a bootstrap configuration as part of the manufacturing process. The bootstrap configuration may have the format shown in Table 1, which is described in detail below.

Blocks 204 to 216 represent a process of iterating through interfaces of a device to identify an interface that has connectivity to a configuration server. In block 204, an index variable I is set to reference the first interface of the first module of the device. In block 206, the Ith interface is configured by applying sub-configuration commands to it, as discussed below in connection with FIG. 2C-FIG. 2H. Also, in block 206, a timer, Timer A is started. In block 208, the device attempts to establish connectivity over a frame relay connection for the Ith interface.

In block 210, a test is performed to determine whether the attempt to establish connectivity through the frame relay network is successful. If connectivity has been successfully established, then in block 213, Timer A is cleared. The device may proceed to request a permanent configuration from a configuration server via the virtual circuit over which connectivity was established, as discussed below in connection with FIG. 3A, FIG. 3B. If the attempt was is not successful, then in block 212, the configuration applied at block 206 is removed.

In block 214, a test is performed to determine if the Ith interface is the last interface in the module then under consideration. If so, then control continues at FIG. 2B. Otherwise, if other interfaces in the same module remain to be tested for connectivity, then in block 216 the value of I is incremented and control returns to block 206 to consider the next available interface.

Referring now to FIG. 2B, block 218 is reached when all interfaces of a particular module have been tested; in block 218, a test is performed to determine whether the then-current module is the last module in the device of a particular type. In this context, "type" refers to technology type, such as ATM, serial or the like. If additional modules are present in the device, then in block 220, the next module of the same module type is considered and I is updated to reference the first interface in that module. Control then continues at block 206 of FIG. 2A.

However, if the test of block 218 determines that the last module of the current type has been considered, then in block 222 a test is performed to determine whether the device contains other modules of other types. If so, then in block 224 the next module type is considered. Otherwise, control reaches block 226 when all interfaces of all modules of all module types have been tested. If no connectivity is then available, then an error message is generated.

Table 1A depicts a sample configuration for IP over frame, according to one embodiment.

TABLE 1A

SAMPLE CONFIGURATION: IP OVER FRAME

| Line No. | Table 1A: Sample Configuration: IP Over Frame |
|---|---|
| 1 | |
| 2 | cns config initial 10.1.1.1 |
| 3 | cns template connect setup-frame |
| 4 | cli encapsulation frame-relay |
| 5 | exit |
| 6 | |
| 7 | cns template connect ip-over-frame |
| 8 | cli ip address dynamic |
| 9 | cli frame-relay interface-dlci ${dlci} |
| 10 | cli ip route 0.0.0.0 0.0.0.0 ${next-hop} |
| 11 | exit |
| 12 | |
| 13 | cns connect ip-over-frame sleep 15 |
| 14 | discover interface Serial |
| 15 | template setup-frame |
| 16 | discover dlci |
| 17 | template ip-over-frame |
| 18 | |

Using the configuration commands of Table 1A, a device can send information to a configuration server over frame relay using a frame relay interface located in any slot of the device. The configuration contains no specific interface or slot references. Connection to the configuration server is supported over multiple networks and providers.

Line 2 of Table 1A instructs the router to start the process of using the cns connect commands to contact the Configuration Engine. Lines 3-5 represent the template that configures an interface to use Frame Relay encapsulation. Lines 7-11 of Table 1A represent the template that configures a sub-interface to find its own IP address and netmask (line 8) for the DLCI defined by the variable ${dlci} (line 9). Line 10 defines a default route to use.

Lines 13-17 tie the templates together. Line 14 instructs the router to search all of its interfaces with the prefix "Serial". For each interface found the following is performed: (a) Define ${interface} and ${next-hop} to be equal to the name of the interface that is being tried; (b) Line 15 instructs the router to apply the template defined at lines 3 to 5; (c) Line 16 instructs the router to find the list of active DLCI. For each active DLCI perform the following: (i) define ${dlci} as the current active DLCI being tried, (ii) define ${next-hop} as the name of the sub-interface that the following template will be applied to, (iii) Line 17 instructs the router to apply the template defined at lines 7 to 11, (iv) attempt to ping the configuration Engine. Its IP address is given by line 2, (v) If the Ping succeeds then end with Success, (vi) otherwise (the Ping failed) then unapply the template defined at lines 7 to 11, (vii) If there are more active DLCI not tried then pick another active DLCI as the current DLCI and go to step (i); (d) Otherwise (no more active DLCI) then unapply the template defined at lines 3 to 4; (e) If there are more interfaces that match the prefix "Serial" then repeat the steps above with the next interface; (f) Otherwise (no more interfaces) then end with Failure.

In one embodiment, if no interface succeeds in contacting the configuration server, then the device may wait for a period of time and try again. In one embodiment, the discover dlci command is preferably placed at a location after the interface has been configured for frame relay. This facilitates reception of an LMI message. In one embodiment, the cli lines after the discover command will be applied (and un-applied) for each active DLCI. A cli command that use the variable ${dlci} are preferably placed after the discover dlci command in this embodiment.

Table 1B depicts a sample aggregator configuration for IP over frame, according to one embodiment.

TABLE 1B

SAMPLE AGGREGATOR CONFIGURATION: IP OVER FRAME

| Line No. | Table 1B: Sample Aggregator Configuration: IP Over Frame |
|---|---|
| 1 | |
| 2 | interface Serial 0 |
| 3 | encapsulation frame-relay |
| 4 | |
| 5 | !This must be in a sub-interface. Otherwise ip address auto assign |
| 6 | !will not work at the other end. |
| 7 | |
| 8 | interface Serial 0.48 |
| 9 | ip address 10.40.40.1 255.255.255.252 |
| 10 | frame relay interface-dlci 48 |

Lines 2 to 10 of Table 1B indicate configuration information for a device terminating the virtual circuit, such as an aggregator, for example, for use with the configuration information of the device of Table 1A in one embodiment. In the command in lines 2-10, 10.40.40.1 is the IP address of the aggregator. This would produce an IP address of 10.40.40.2 on the new router's interface, which is being configured for frame relay communications. The DLCI used is 48. While the above example is described with respect to IP over frame relay, in alternative embodiments, connectivity may be established using IP over PPP over frame relay.

Table 1C depicts a sample configuration for IP over frame over T1, according to one embodiment.

TABLE 1C

SAMPLE CONFIGURATION: IP OVER FRAME OVER T1

| Line No. | Table 1C: Sample Configuration: IP Over Frame Over T1 |
|---|---|
| 1 | |
| 2 | cns template connect setup-frame |
| 3 | cli encapsulation frame-relay |
| 4 | exit |
| 5 | |
| 6 | cns template connect ip-over-frame |
| 7 | cli ip address dynamic |
| 8 | cli frame-relay interface-dlci ${dlci} |
| 9 | cli ip route 0.0.0.0 0.0.0.0 ${next-hop} |
| 10 | |
| 11 | cns template connect t1-controller |
| 12 | cli framing esf |
| 13 | cli linecode b8zs |
| 14 | cli channel-group 0 timeslots 1-24 speed 56 |
| 15 | exit |
| 16 | |
| 17 | cns connect ip-over-frame-over-t1 sleep 15 |
| 18 | discover controller T1 |
| 19 | template t1-controller |
| 20 | discover interface |
| 21 | template setup-frame |
| 22 | discover dlci |
| 23 | template ip-over-frame |

Lines 2-4 of Table 1C represent the template that configures an interface to use Frame Relay encapsulation. Lines 6-9 of Table 1C represent the template that configures a sub-interface to find its own IP address and netmask (line 7) for the DLCI defined by the variable ${dlci} (line 8). Line 9 defines a default route to use. Lines 11-15 of Table 1C represent the template that configures a controller for T1 operation. The example uses esf framing, and b8zs linecoding for purposes of illustration and not intended to be limiting. Timeslots 1 to 24 are used in the channel group.

Lines 17-23 tie the templates together. Line 18 instructs the router to search all of its controllers with the prefix "T1". For each controller found the following is performed: (a) Define ${controller} to be equal to the name of the controller that is being tried; (b) Line 19 instructs the router to apply the template defined at lines 11-15; (c) Define ${interface} and ${next-hop} to be equal to the name of the interface that is being tried; (d) Line 20 instructs the router to find the list of interfaces that are related to the current controller. For each interface perform the following: (i) Line 21 instructs the router to apply the template defined at lines 2-4, (ii) Line 22 instructs the router to find the list of active DLCI. For each active DLCI perform the following: (1) define ${dlci} as the current active DLCI being tried, (2) define ${next-hop} as the name of the sub-interface that the following template will be applied to, (3) Line 23 instructs the router to apply the template defined at lines 6-9, (4) Attempt to ping the configuration Engine, (5) If the Ping succeeds then end with Success, (6) Otherwise (the Ping failed) then unapply the template defined at lines 6-9, (7) If there are more active DLCI not tired then pick another active DLCI as the current DLCI and go to step (1); (iii) Otherwise (no more active DLCI) then unapply the template defined at lines 2-4, (iv) If there are more interfaces that are related to the current controller then continue at (i) with the next interface; (d) Otherwise (no more interfaces) then if there are more controllers that match the prefix "T1" then set the current controller to the next controller and go to step (a); and (e) Otherwise (no more controllers) then end with Failure.

Many other types of commands may be used in configuring devices for use in various other specific embodiments of the present invention. Accordingly the above example configuration commands of Tables 1A-1C are intended to be merely illustrative and not limiting of the embodiments of the present invention.

Figure 2C:
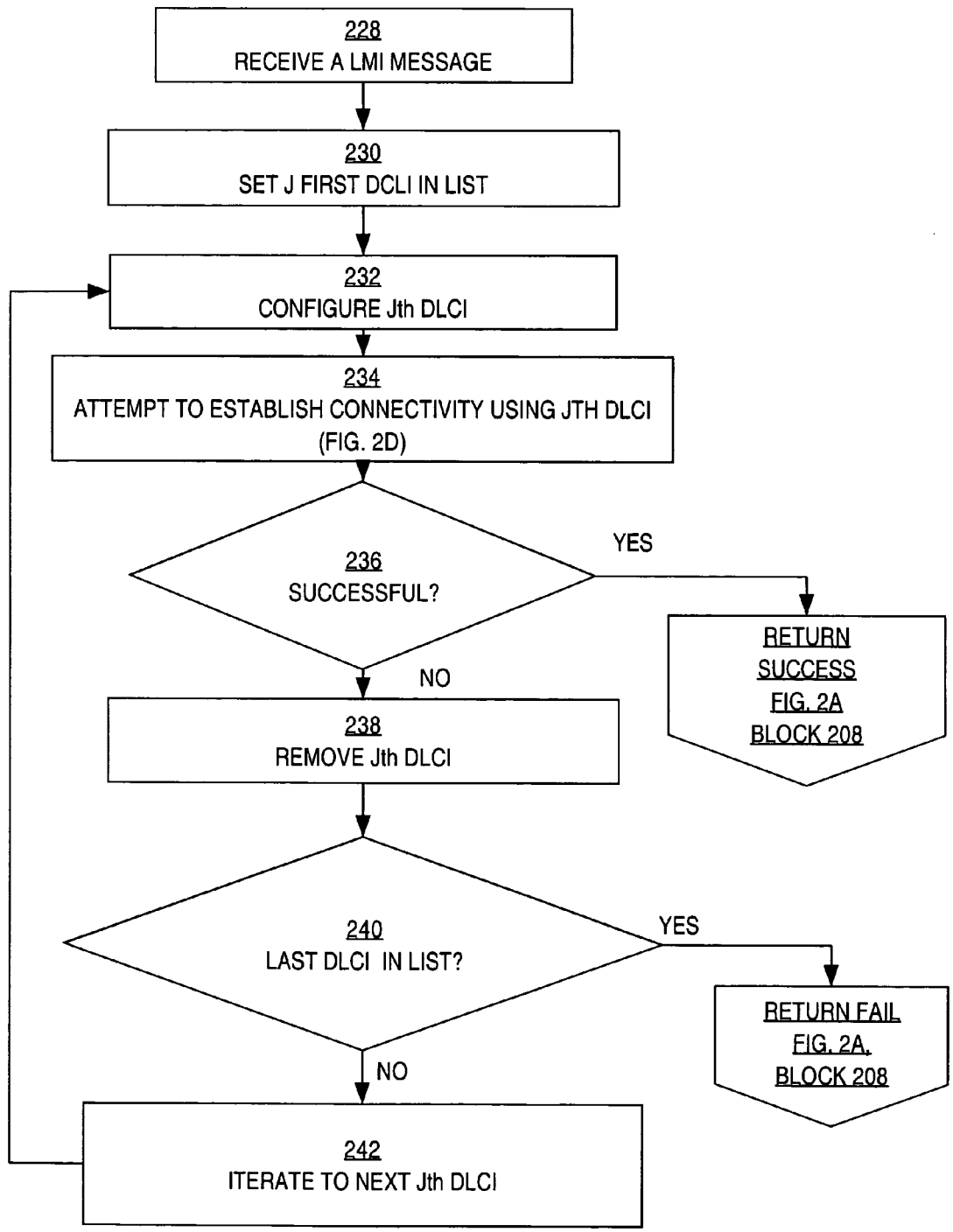

Referring now to FIG. 2C, in block 228, a list of identifiers for active virtual circuits in the network is received. For example, when the device configures a particular interface for frame relay, the frame-relay network interface subsystem will send an LMI message comprising a list of DLCIs in the network to the device. In block 230, an index variable J is to set to reference the first DLCI in the network.

Blocks 232 to 242 illustrate a process of iterating through the active DLCIs in a frame-relay type network to identify at least one virtual circuit through which connectivity to the desired remote device, such as a configuration server, may be established. In block 232, the Jth DLCI is configured. In block 234, the device attempts to establish connectivity using the Jth DLCI, as is described in further detail to reference to FIG. 2D.

In block 236, a test is performed to determine whether the processing of block 234 was successful. If, in block 234, the device established connectivity, then the device returns an indication of success back to FIG. 2A, block 208. If the device was not successful in establishing connectivity, then in block 238, the configuration for the DLCI under test applied in block 232 is removed.

In block 240, a test is performed to determine if the Jth DLCI is the last virtual circuit identifier in the network then under consideration. If so, then the device returns an indication of failure to FIG. 2A, block 208. Otherwise, if other interfaces in the same network remain to be tested for connectivity, then in block 242 the value of J is incremented and control returns to block 232 to consider the next available virtual circuit identifier.

Figure 2D:
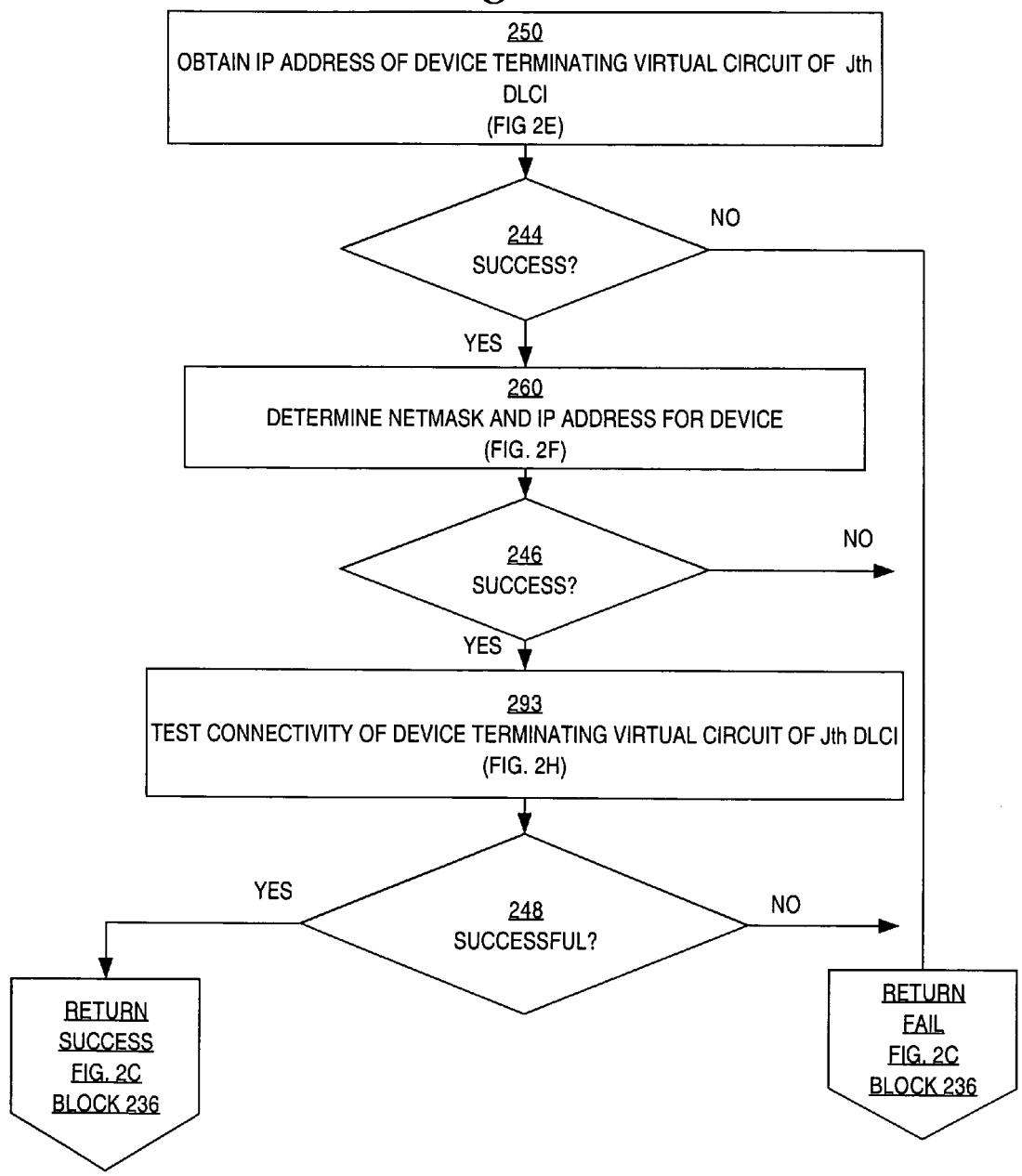

Referring now to FIG. 2D, in block 250, the device attempts to obtain an IP address of a device terminating the virtual circuit of the Jth DLCI, as is further described below with reference to FIG. 2E.

In block 244, a test is performed to determine whether the attempt to obtain an IP address of a device terminating the virtual circuit of the Jth DLCI is successful. If the attempt to obtain an IP address is successful, then control continues with block 260. Otherwise, if the attempt to obtain an IP address of a device terminating the virtual circuit of the Jth DLCI is not successful, then the device returns an indication of failure to FIG. 2C block 236.

In block 260, the device determines a netmask suitable for use with the device while the device is connected with the device terminating the virtual circuit. This processing is described in further detail below with reference to FIG. 2F. As part of this processing, the device will also select an IP address for itself that is valid in the subnet of the device based upon the address of the device terminating the virtual circuit, as is described in further detail below with reference to FIG. 2G.

In block 246, a test is performed to determine whether the processing to determine a netmask and an IP address for the device is successful. If the netmask and IP address have been determined successfully, then control continues with block 293. Otherwise, if the attempt to determine a netmask and an IP address for the device is not successful, then the device returns an indication of failure to FIG. 2C block 236.

In block 293, the device tests the connectivity of the device terminating the virtual circuit of Jth DLCI, as described in further detail with reference to FIG. 2H below.

In block 248, a test is performed to determine whether the device successfully established connectivity with the device terminating the virtual circuit of Jth DLCI. If connectivity is established, the device returns an indication of success to FIG. 2C, block 236. Otherwise, if the attempt to establish connectivity is not successful, then the device returns an indication of failure to FIG. 2C, block 236.

3.3 Obtaining an IP Address for the Device Terminating the Virtual Circuit

A process of obtaining an IP address for the device terminating the virtual circuit uses an Inverse Address Resolution Protocol message. Inverse address resolution protocol (IARP) enables a frame-relay station to discover the protocol address of another station associated with a virtual circuit. Further detail regarding Inverse Address Resolution Protocol, is provided in a publication by the Network Working Group of IETF, "Request for Comments (RFC) 2390" (ftp://ftp.rfc-editor.org/in-notes/RFC_2390.txt, accessed Nov. 13, 2003), which is incorporated herein by reference for all purposes as if fully set forth herein.

Figure 2E:
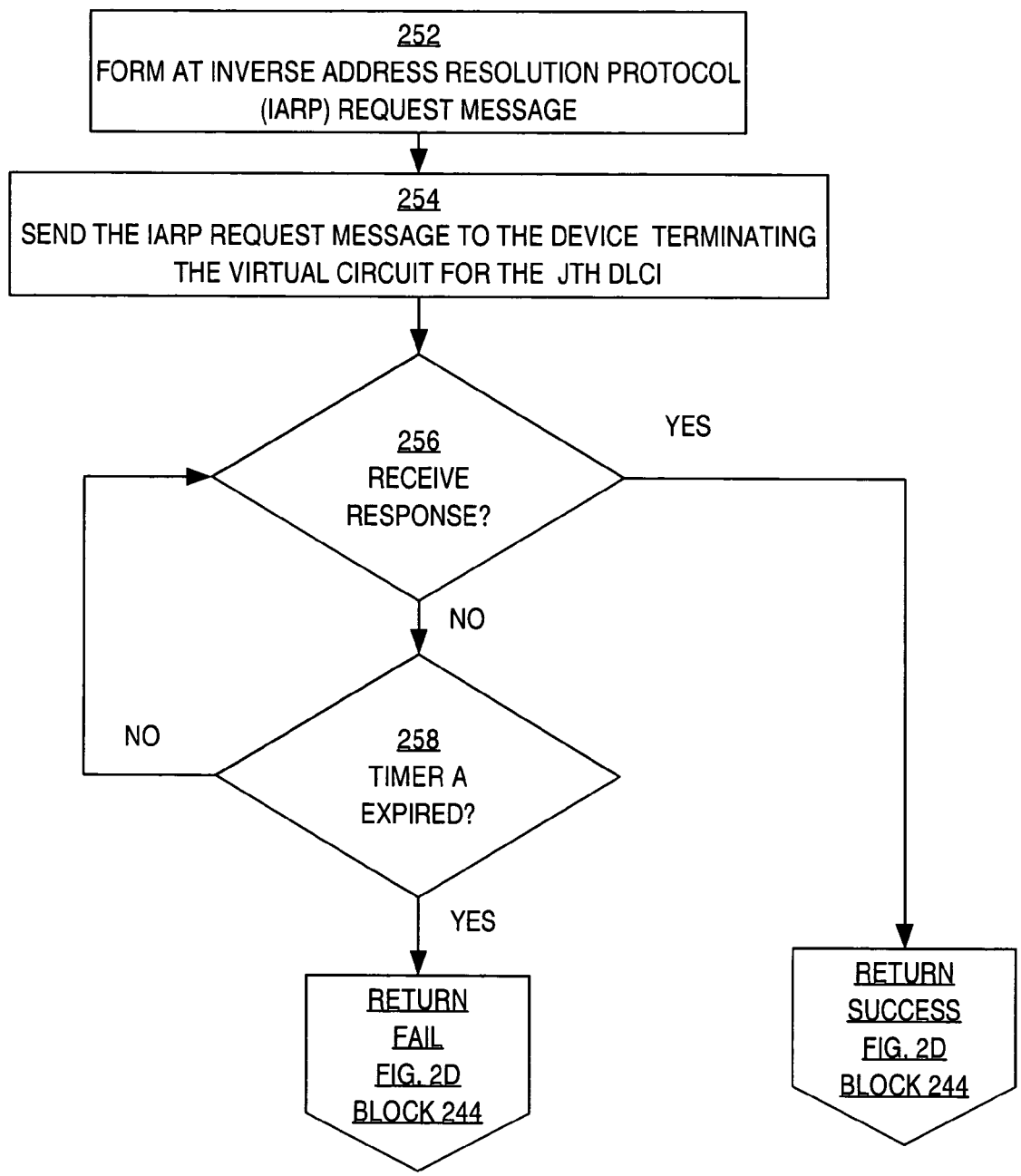

FIG. 2E is a flow diagram that illustrates the steps in a method for obtaining an IP address for a device terminating the virtual circuit one embodiment.

In block 252, the device forms an Inverse Address Resolution Protocol (IARP) request message. In one embodiment, the device formats the IARP request message using the format described in Table 2, below.

In block 254, the device sends the IARP request message to the device terminating the virtual circuit for the Jth DLCI.

In block 256, the device receives a response message containing an IP address for the device terminating the virtual circuit of the Jth DLCI.

In block 256, a test is performed to determine whether the device successfully received a response message containing an IP address for the device terminating the virtual circuit. If the IP address for the device terminating the virtual circuit is established successfully, the device returns an indication of success to FIG. 2D, block 244. Otherwise, if the response message containing the IP address of the device terminating the virtual circuit is not received successfully, then processing continues with test block 258. In block 258, a test is performed to determine whether Timer A has expired. If Timer A has not expired, then processing continues back to block 256 to again check for a response message. Otherwise, if Timer A has expired, then the device returns an indication of failure to FIG. 2D, block 244.

As an example, Table 2 depicts an IARP message format that may be used in obtaining an IP address for a remotely positioned device terminating a virtual circuit, according to one embodiment.

TABLE 2

IARP MESSAGE FORMAT

Line No.   Table 2: Example Packet Format of IARP message

| Line No. | Field | Size | Description |
|---|---|---|---|
| 1 | | | |
| 2 | ar$hrd | 16 bits | Hardware type |
| 3 | ar$pro | 16 bits | Protocol type |
| 4 | ar$hln | 8 bits | Byte length of each hardware address (n) |
| 5 | ar$pln | 8 bits | Byte length of each protocol address (m) |
| 6 | ar$op | 16 bits | Operation code |
| 7 | ar$sha | Nbytes | source hardware address |
| 8 | ar$spa | Mbytes | source protocol address |
| 9 | ar$tha | Nbytes | target hardware address |
| 10 | ar$tpa | Mbytes | target protocol address |
| 11 | | | |
| 12 | | | |

In Table 2, the length of the hardware and protocol address are dependent on the environment in which IARP is running. For example, if IP is running over Frame Relay, the hardware address length may be either 2, 3, or 4, and the protocol address length is 4. In one embodiment, if the device does not have an IP address, the source IP address is set to an arbitrary value to avoid a zero value causing the receiver to discard the IARP message.

The operation code indicates the type of message, request or response:

InARP request=8

InARP response=9

While the present invention is illustrated by way of example embodiments using IARP as the mechanism for the CPE to acquire IP address from the aggregator, this does not preclude the use of other protocols instead of IARP such as DHCP, BOOTP, SLARP or the like, enabling the CPE to discover its IP address across the PVC. In such embodiments, the references to IP address net mask, sub-net and addressing computations may not all necessarily apply to each embodiment, and further, some embodiments will use other techniques known to those in the art to employ such protocols to obtain addressability of the device terminating the virtual circuit.

3.4 Determining an IP Address and a Suitable Netmask for the Device

A process of determining an IP address for the device will now be described with reference to an example embodiment. The device configures its own IP address for use with the IP address of the device terminating the virtual circuit over the frame relay network. The device is able to choose its own IP address subject to the following criteria: 1) the IP address of the device and the IP address of the device terminating the virtual circuit must be in the respective subnets used at each end; and 2) each IP address must be valid for use in the subnet used at the IP address' end. In other words, neither IP address can be the network ID or broadcast address for its subnet.

Regarding the first condition, since the device is able to choose its own IP address, in one embodiment, a suitable IP address may be selected that satisfies the first condition by adding or subtracting 0.0.0.1 to the IP address of the device terminating virtual circuit. This technique may be applied to IP version 6 installations as well as IP version 4 by adding or subtracting 1 from the IP version 6 address.

Regarding the second condition, three situations can occur when comparing the device's netmask and the terminating device's netmask: A) the subnet on the device is larger than that of the device terminating virtual circuit. This situation could result in incorrect routing of some IP addresses. Accordingly, this situation should not be configured; B) the subnet on the device is equal to that of the device terminating the virtual circuit. This is ideal; and C) the subnet on the device is smaller than that of the device terminating virtual circuit. As long as the IP address of both sides of the link are in both subnets and both IP addresses are valid within each subnet, IP routing will work.

The device selects an IP address for its interface. If the subnet of the device terminating the virtual circuit is (equal to or) larger than that of the device, then if the device chooses an IP address that is valid and within its subnet, the IP address will also be valid and within the subnet of the device terminating the virtual circuit. Accordingly, a netmask for the device should satisfy conditions B or C.

Because the IP address of the device terminating the virtual circuit is valid for its netmask, the device selects a subnet so that it is smaller than, or equal to that of the device terminating the virtual circuit. To do this, the device starts with the smallest subnet—a netmask of 30 bits (255.255.255.252) and tests if the IP address of the device terminating the virtual circuit is valid for this netmask. If the IP address of the device terminating the virtual circuit satisfies the conditions of point 2 above, i.e., it is neither the network ID nor the broadcast address, then the selected netmask may be used. Otherwise the device tries the next smallest size subnet range (i.e., a netmask of 29 bits) and tests if the IP address of the device terminating the virtual circuit is valid for this netmask. If the IP address of the device terminating the virtual circuit is valid for this netmask, then this netmask is selected. Otherwise the next smallest size subnet range (i.e. a netmask of 28 bits) is tested. This process is repeated until a netmask is found for which the address of the device terminating the virtual circuit is valid.

The resulting netmask will produce a subnet that is equal to, or is smaller than that of the device terminating the virtual circuit. That is, either condition B or C is satisfied.

Another way to compute the netmask may be expressed as: find the largest netmask less than or equal to 30 bits (expressed as e.g. 255.255.255.252) such that the following expression (in C programming language notation) is TRUE;

((ip_address_of_the device_terminating_VC & ~netmask) !=0) &&

((ip_address_of_the_device_terminating the VC | netmask) !=~0)

Once a suitable netmask is chosen, an IP address may be selected for the device. The IP address for the device is selected such that the IP address for the device is within the subnet of the device based upon the address of the device terminating the virtual circuit. One technique for selecting the IP address for the device is as follows: add 0.0.0.1 (for IP version 4 embodiments) to the IP address of the device terminating the virtual circuit and test if the resulting address is valid within the device's subnet. If the resulting address is valid within the device's subnet, choose the result as the IP address of the device. Otherwise, subtract 0.0.0.1 from the IP address of the device terminating the virtual circuit. Then, assign the device's IP address to the value of the result.

Figure 2F:
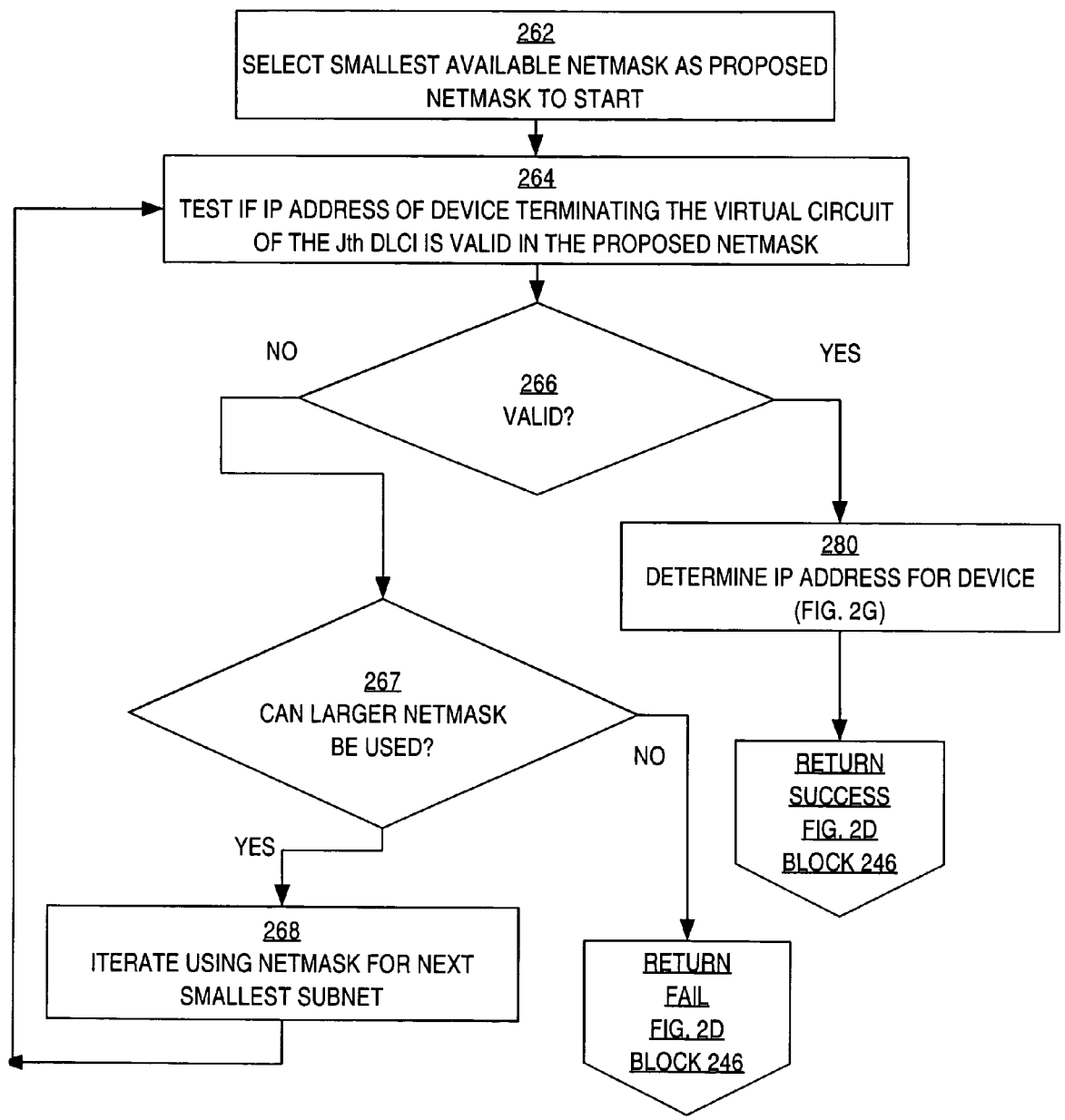

FIG. 2F is a flow diagram that illustrates the steps in a method for determining a netmask and an IP address for the device for use in communicating with the device terminating the virtual circuit one embodiment.

In block 262, the device selects a smallest available netmask as a proposed netmask with which to start. In block 264 the device tests if the IP address of the device terminating the virtual circuit of the Jth DLCI is valid in the proposed netmask.

In block 266, a test is performed to determine whether the IP address on the device terminating the virtual circuit is valid within the proposed netmask. If the IP address for the device terminating the virtual circuit is valid in the proposed netmask, then in block 280 the device determines an IP address for itself within the proposed netmask, as further described with reference to FIG. 2G. After the processing of FIG. 2G, the device returns an indication of success to FIG. 2D, block 246. Otherwise, if the IP address of the device terminating the virtual circuit is not valid within the proposed netmask, then in block 267, a test is performed to determine whether a larger netmask is available. If a larger netmask is available, then in block 268, the device selects a new proposed netmask for the next smallest available subnet and control passes back to block 264 to test the validity of the IP address of the device terminating the virtual circuit in the new proposed netmask. Otherwise, if a larger netmask is not available, then the device returns an indication of failure to FIG. 2D, block 246.

The process of determining a suitable IP address for the device invoked by block 280 in FIG. 2F will next be discussed in greater detail with reference to FIG. 2G.

Figure 2G:
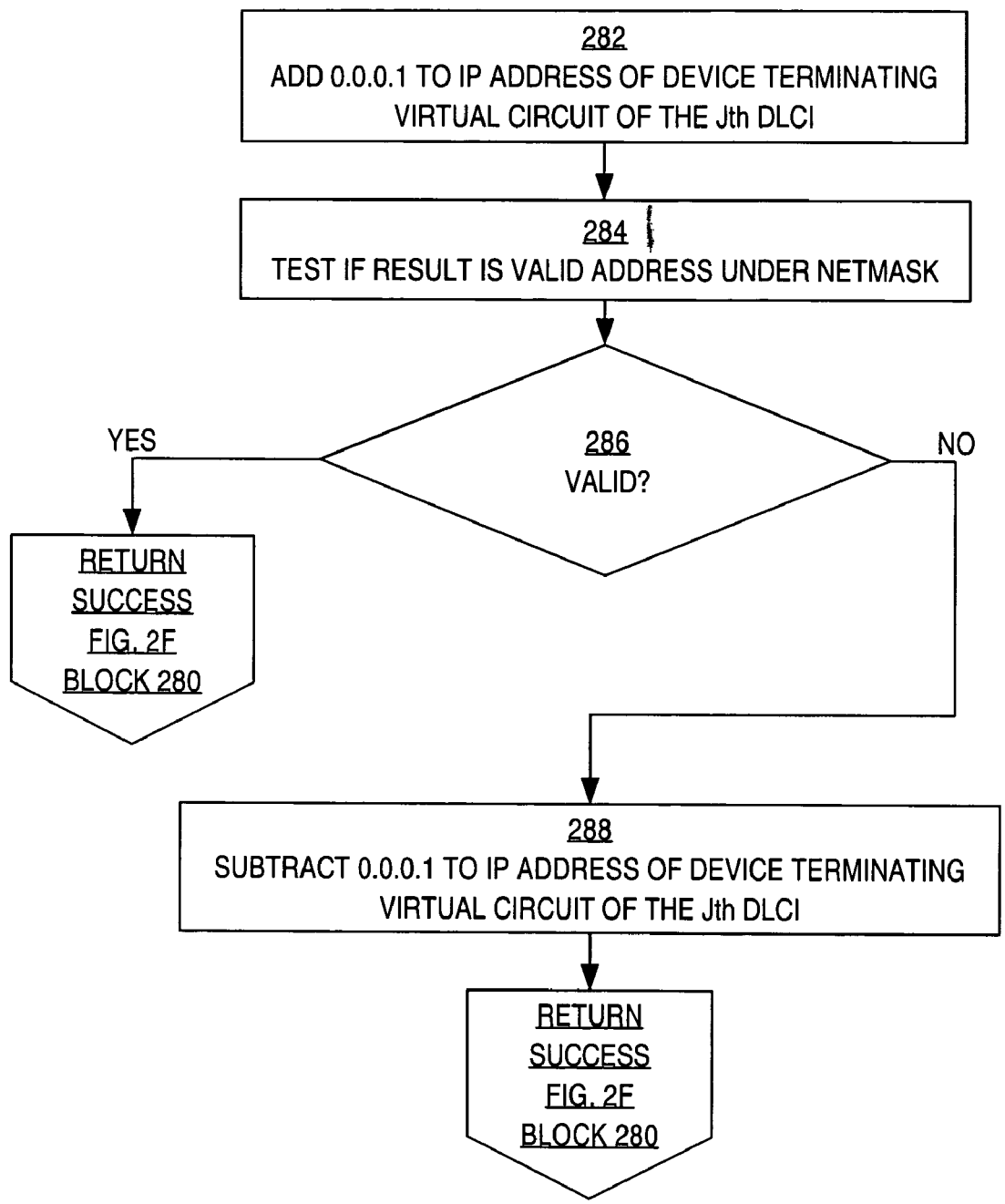

Referring now to FIG. 2G, in block 282 the device adds 0.0.0.1 to the IP address of the device terminating the virtual circuit of the Jth. DLCI. Then, in block 284, the device tests if the result is a valid address under the present netmask.

In block 286, a test is performed to determine whether the result is a valid IP address under the netmask. If the result is a valid IP address for the device in the netmask, the device returns an indication of success to FIG. 2F, block 280. Otherwise, control passes to block 288, in which the device subtracts 0.0.0.1 from the IP address of the device terminating the virtual circuit of the Jth DLCI to form a second result. Then, the device returns an indication of success to FIG. 2F, block 280.

Embodiments using IP version 6 can perform processing analogous to that of blocks 282 to 288 of FIG. 2G by adding and/or subtracting 1 from the IP version 6 address.

A representative procedure for selecting an IP address for the device based upon the netmask of a device terminating a virtual circuit in one embodiment using IP version 4 will be illustrated by examples in Table 3, below.

TABLE 3

EXAMPLES OF SELECTING A NETMASK AND AN IP ADDRESS

Examples of selecting an IP address

```
 1
 2  The Aggregator uses a netmask of 6.6.60.0/30:
 3
 4  6.6.60.0 - Unusable, network address
 5  6.6.60.1 - Ok to use
 6  6.6.60.2 - Ok to use
 7  6.6.60.3 - Unusable, broadcast address
 8  Cases:
 9  1. The Aggregator has an IP address of 6.6.60.1, the CPE finds that a
10     netmask of 30 bits allows this IP address to be valid. It now
11     chooses an IP address for itself. First it tried 6.6.60.1 +
12     0.0.0.1 = 6.6.60.2. This is a valid IP address.
13
14  2. The Aggregator has an IP address of 6.6.60.2, the CPE finds that a
15     netmask of 30 bits allows this IP address to be valid. It now
16     chooses an IP address for itself. First it tried 6.6.60.2 +
17     0.0.0.1 = 6.6.60.3. This is not a valid IP address, so the
18     CPE uses 6.6.60.2 – 0.0.0.1 = 6.6.60.1.
19
20
21  The Aggregator uses a netmask of 6.6.60.0/28:
22
23  6.6.60.0 - Unusable, network address
24  6.6.60.1 - Ok to use
25  6.6.60.2 - Ok to use
26  6.6.60.3 - Ok to use
27  6.6.60.4 - Ok to use
28  6.6.60.5 - Ok to use
29  6.6.60.6 - Ok to use
30  6.6.60.7 - Unusable, broadcast address
31
32  Cases:
33
34  1. The Aggregator has an IP address of 6.6.60.1, the CPE finds that
35     a netmask of 30 bits allows this IP address to be valid. It now
36     chooses an IP address for itself. First it tried 6.6.60.1 +
37     0.0.0.1 = 6.6.60.2. This is a valid IP address.
38
39  2. The Aggregator has an IP address of 6.6.60.2, the CPE finds that
40     a netmask of 30 bits allows this IP address to be valid. It now
41     chooses an IP address for itself. First it tried 6.6.60.2 +
42     0.0.0.1 = 6.6.60.3. This is not a valid IP address, so the
43     CPE uses 6.6.60.2 – 0.0.0.1 = 6.6.60.1.
44  3. The Aggregator has an IP address of 6.6.60.3, the CPE finds that
45     a netmask of 30 bits does not allow this IP address to be valid.
46     It then tries a netmask of 29 bits. This does allow the IP address
47     to be valid. It now chooses an IP address for itself. First it tries
48     6.6.60.3 + 0.0.0.1 = 6.6.60.4. This is a valid IP address.
49
```

In one embodiment, the above-described computation is based on an IP address of an aggregator because it is the device having an IP address at the other end of a Frame Relay point to point link, i.e., a virtual circuit. The aggregator will then forward messages (all IP packets sent through it) based on its IP routing table. Accordingly, in this type of implementation, once a connection to the aggregator has been established, it is able to forward all messages to a configuration server, comprising the remote device intended to be reached. That is, in such embodiments, connectivity to the aggregator implies connectivity to the configuration server.

3.5 Establishing Connectivity with a Configuration Server

A ping ICMP message may be used to verify connectivity with the configuration server over the presently configured virtual circuit. The destination IP address of the ping message is typically a configuration server. In one embodiment, messages intended for the configuration server are routed via an aggregator that terminates a virtual circuit with the device. In an embodiment, this may be achieved with a static route command that is added to the router's config ip address 0.0.0.0 0.0.0.0 ${next-hop} where ${next-hop} is the name of the sub-interface to use, e.g. Serial0.9999.

Figure 2H:
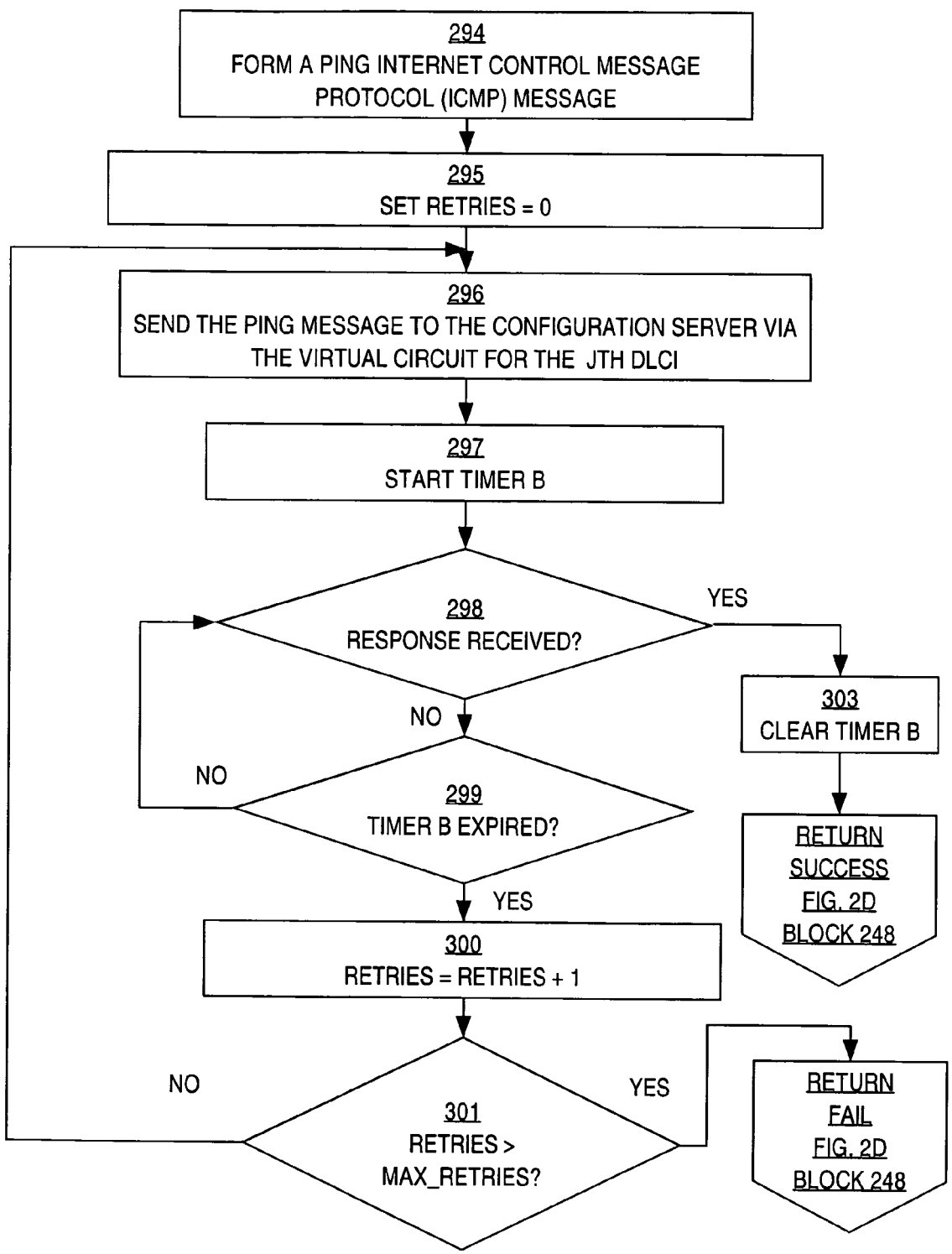

FIG. 2H is a flow diagram that illustrates the steps in a method for testing whether connectivity is established to a configuration server over a virtual circuit path in one embodiment.

In block 294, the device forms a ping Internet Control Message Protocol (ICMP) message. In block 295 a counter for a number of retries for attempting to establish connectivity is set to an initial value.

In block 296 the device sends the ping message to the configuration server over the virtual circuit for the Jth DLCI.

In block 297, the device starts a timer, Timer B.

In block 298, a test is performed to determine whether a ping response was received. If a response is received, then the ping is successful meaning that connectivity is established between the device and the configuration server over the virtual circuit. In block 303, the device clears Timer B and returns an indication of success to FIG. 2D, block 248. Otherwise, if the response is not received, then connectivity is not established, and the device passes control to block 299.

In block 299, the device checks whether Timer B has expired. If Timer B has not expired, then control passes back to block 298 to again check for a response. Otherwise, if Timer B has expired, then the device continues processing with block 300. In block 300, the retry counter is incremented, and in block 301 a test is performed to see if the maximum allotted number of retries is exceeded. If the maximum number of retries has not been exceeded, then control passes to block 296 to again attempt to establish connectivity by sending another ping message. Otherwise, if the maximum number of retries has occurred, then control passes an indication of failure to FIG. 2D, block 248. Control will be returned back to processes that will select the next DLCI for testing.

In one embodiment, the device terminating the virtual circuit is able to route the ping message to the configuration server. For example, if the device terminating the virtual circuit is an aggregator, it will send the ping message to a configuration server because the message has a destination IP address of the configuration server. The device terminating the virtual circuit is able to route the ping message because its configuration information includes a statement such as "cns config initial <IP_ADDRESS>."

which may in some networks be accessible over a virtual circuit network, such as frame relay or ATM.

In general, a process is provided for resolving a set of relative interface references into absolute interface references based on real-time inventory from the device. In the process, a generic management point template configuration contains special characters signifying substitution strings. When inventory information is received from the device, the generic template configuration is modified by substituting device-specific inventory values for the substitution strings. In contrast, in past approaches, templates referred to slots and interface positions using fixed values.

Figure 3A:
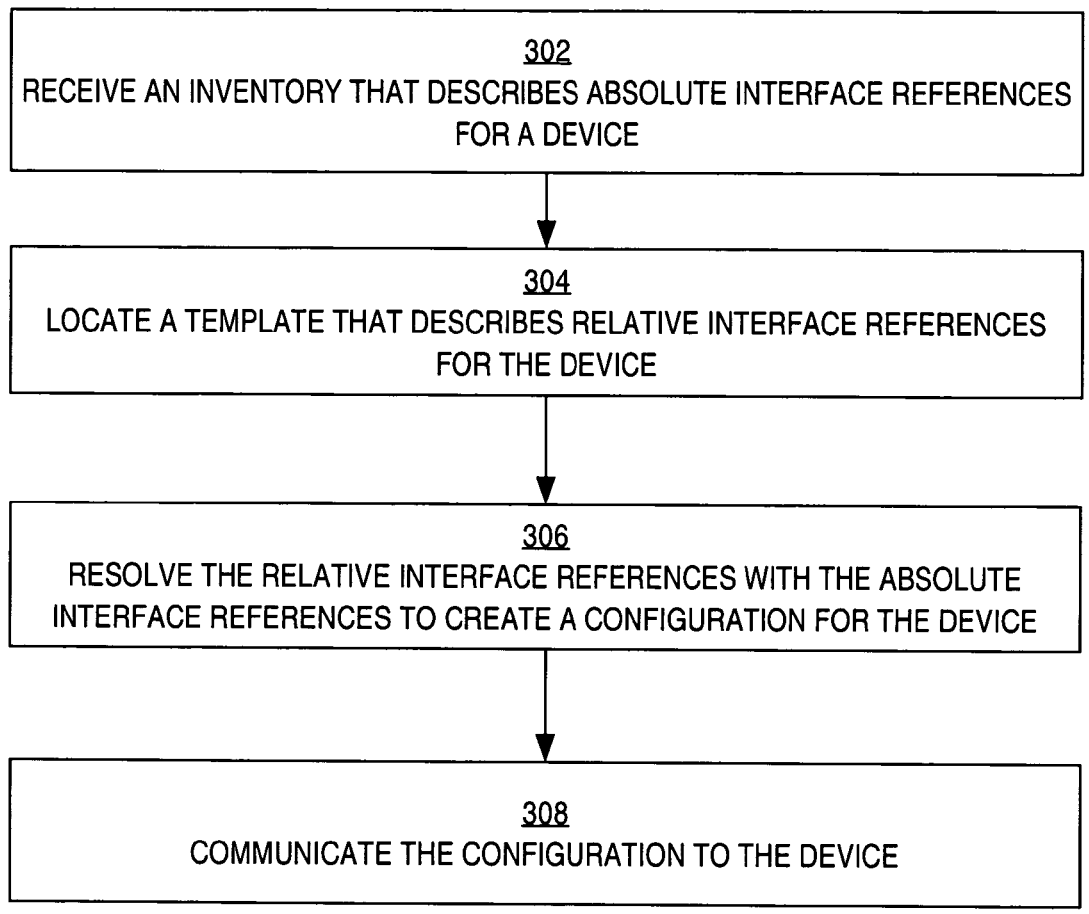
FIGS. 3A-3B are flow diagrams that illustrates a high level overview of an operational example of one embodiment of a method for provisioning a device in a virtual circuit network environment.

FIG. 3A is a flow diagram showing a process for automatically provisioning a device. In general, FIG. 3A represents processing steps that are performed by a management station, which may be integrated with, or cooperatively located with the configuration server in specific embodiments. In block 302, an inventory is received that describes absolute interface references for a device. For example, the inventory described herein with respect to FIG. 3B may be received from another device at the management station.

In block 304, a template that describes relative interface references for the device is located. Block 304 may involve retrieving, from a repository such as a directory or database, a template for a permanent device configuration based on a device type value that is received in the inventory from the device.

In block 306, relative interface references in the configuration template are resolved into absolute interface references based on the values that are received in the inventory from the device. In block 308, the resolved permanent configuration is downloaded to the device.

Figure 3B:
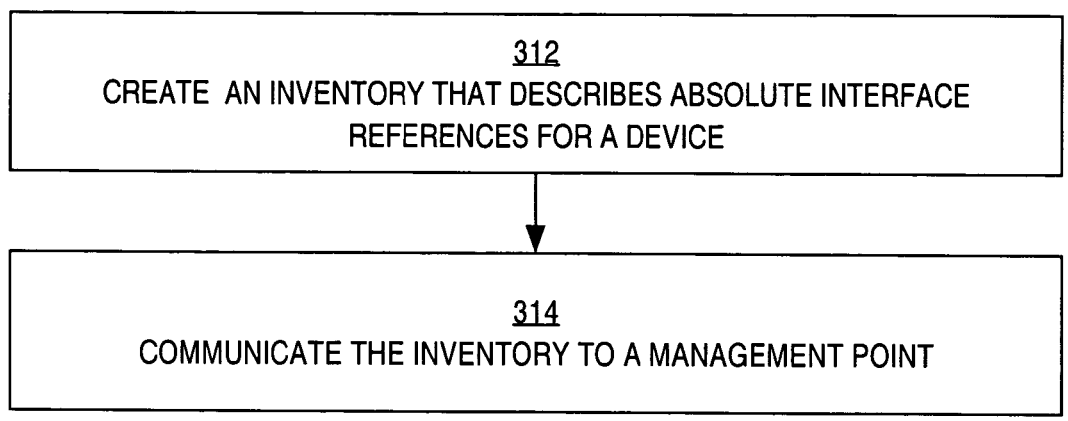

FIG. 3B illustrates representative processing of a process at a management point, which may be resident on a configuration server, or alternatively disposed in another device cooperatively connected with the configuration server. In block 312, an inventory is created that describes absolute interface references for a device. In block 314, the inventory is provided to the management point.

As an example, Table 4 depicts a management point template that may be used in relative interface resolution by a configuration server or the like, according to one embodiment.

TABLE 4

EXAMPLE MANAGEMENT POINT TEMPLATE

| Line No. | Commands |
|---|---|
| 1 | ! |
| 2 | Interface Serial %Serial0% |
| 3 |    ip address ${LPDAP://this::attrName=IOSipaddress} 255.255.255.0 |
| 4 |    no shutdown |
| 5 | ! |
| 6 | Interface Serial %Serial1% |
| 7 |    ip address ${LPDAP://this::attrName=IOSipaddress} 255.255.255.0 |
| 8 |    no shutdown |
| 9 | ! |

3.6 Generating an Application Specific Configuration

One application for automatic provisioning techniques implemented in one embodiment is the ability for a device to automatically retrieve a configuration for itself from a remote management point, such as a configuration server, or the like, Table 4 depicts commands on line 2 and line 6 that include relative interface reference for serial interfaces. The relative interface addresses may be replaced with absolute interface references from an inventory. For example, on line 2, the relative interface reference "% Serial0%" may be replaced with the absolute interface reference "Serial0/0" if this is appropriate based on information received from the device. Similarly, on line 6, the relative interface reference "% Serial1%" may be replaced with the absolute interface reference "Serial0/1". In general, an example of syntax for a substitution string is:

%<Type of interface><logical port number>%

According to an embodiment, the use of such relative references and templates with substitution strings also facilitates creating a computer memory representation of a device, as part of a management point application, using more sophisticated data structures. In past approaches, a management point application would represent a device in application memory as a single logical object in a database, keyed to a unique device identifier, such as a chassis number. The device object would be created at the management point at the time that the management point or its associated service provider issued an order for a particular device.

In the present approach, at the time that a service provider orders a device for delivery to a subscriber, a management point application creates a main device object. The main device object represents and is based on a chassis type of the device, and contains one or more sub objects. Further, the main device object is associated with or points to a configuration template, containing substitution strings of the type shown above in Table 4. The management point maintains one configuration template for each general type of device. For example, all main device objects for all Cisco 2600 routers that are deployed by a particular service operator are associated with the same configuration template.

Each sub object represents a module in the device. Based on the inventory, the management point dynamically creates or instantiates one or more sub objects based on the modules that are discovered in inventory. Thus, there is one sub object for each line card. Each sub object maps to a module of the device, and each sub object may carry a name that corresponds to a module type. Each module generally comprises a product identifier that is associated with a sub object. Sets of configuration commands associated with an interface of a module may be associated in the management point application with a corresponding sub object.

Such an object model also may be maintained in a persistent repository that is accessible to the management point. For example, an LDAP directory or database may be used.

Using this approach, a device may send a request for a permanent configuration to the management point. In the request, the device provides its unique device identifier. At the management point, based on the device identifier, the corresponding device object is located. The management point then retrieves the configuration template that is referenced by the device object. Values from the inventory message are substituted into the configuration template at locations indicated by the substitution strings. As a result, a final device configuration is created. The final device configuration is then downloaded to the device and is executed by the device.

4.0 IMPLEMENTATION MECHANISMS

Hardware Overview

Figure 4:
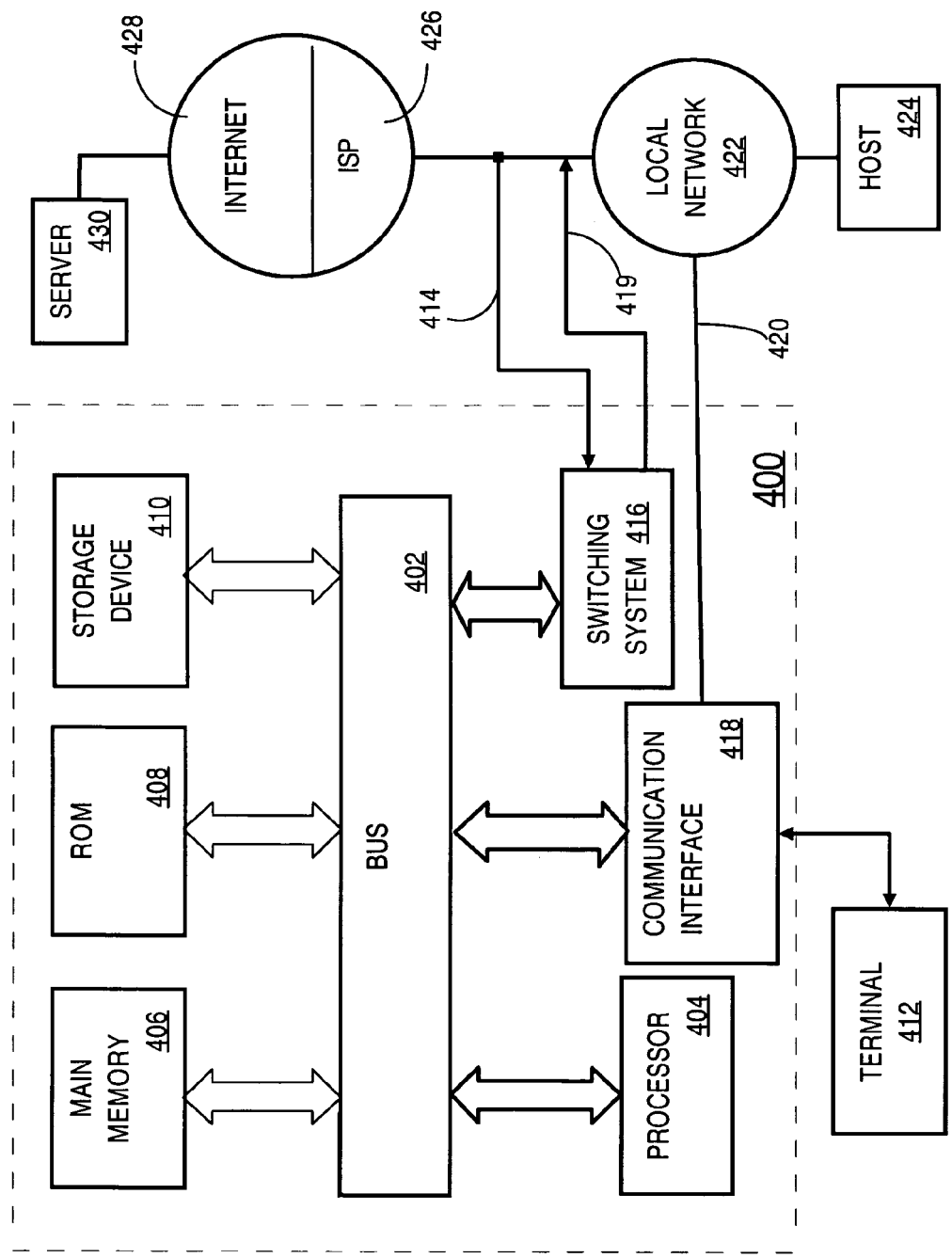
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for providing automatic provisioning for modular network devices. According to one embodiment of the invention, providing automatic provisioning for modular network devices are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for providing automatic provisioning for modular network devices as described herein.

The received code may be executed by processor 404 as it is received, and/or stored in storage device 410, or other non-volatile storage for later execution. In this manner, computer system 400 may obtain application code in the form of a carrier wave.

5.0 EXTENSIONS AND ALTERNATIVES

Accordingly, techniques for automatically provisioning network devices to work with virtual circuit to networks, such as frame relay and ATM networks, have been described. Specific embodiments address problems associated with the installation and management of network devices, including issues relating to establishing connectivity to a remote device over a virtual circuit in a newly configured network device, determining compatible netmasks and IP addresses for newly configured network devices, automating configuration deployment and providing reliable maintenance of network inventory.

In one embodiment, several problems relating to establishing connectivity with a remote configuration server across a virtual switch circuit network are addressed. In particular, specific embodiments provide techniques for locating active virtual circuits in the virtual circuit network, selecting from among the active virtual circuits a virtual circuit that provides a path to the desired remote device. Further, specific embodiments provide techniques for obtaining an IP address of a remote device terminating a particular virtual circuit, and for determining a compatible netmask and IP address for the device being configured.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of provisioning a first device operable with internet protocol (IP) in a virtual circuit network, the method comprising the computer-implemented steps of:

the first device requesting a list of identifiers corresponding to virtual circuits from a configuration interface for the virtual circuit network;

receiving the list of identifiers corresponding to virtual circuits from the configuration interface for the virtual circuit network; and iteratively applying each identifier to individual instances of interface configuration commands until connectivity with a remote device is established, comprising the steps of:

requesting, from a second device terminating the virtual circuit corresponding to an identifier selected from the list, an IP address of the second device;

wherein the second device terminating the virtual circuit is operable to provide connectivity to the remote device;

wherein the second device terminating the virtual circuit is operable to route messages that are destined to the remote device, and wherein the remote device is operable to provide configuration information to configure the first device;

receiving the IP address of the second device terminating the virtual circuit corresponding to the identifier selected from the list;

determining an IP address for the first device;

testing the virtual circuit corresponding to the identifier selected from the list for connectivity with the remote device; and if the virtual circuit corresponding to the selected identifier provides connectivity to the remote device, then choosing the virtual circuit corresponding to the selected identifier for connecting to the remote device, otherwise, iteratively applying the above steps for a next identifier in the list until the list is exhausted.

2. A method as recited in claim 1, wherein the virtual circuit network comprises a frame relay network, and wherein the step of receiving the list of identifiers corresponding to virtual circuits from the configuration interface for the virtual circuit network further comprises:

receiving a Local Management Interface (LMI) message comprising a list of at least one of a plurality of Data Link Connection Identifiers (DLCIs) in the network.

3. A method as recited in claim 1, wherein the virtual circuit network comprises an Asynchronous Transfer Method (ATM) relay network, and wherein the step of receiving the list of identifiers corresponding to virtual circuits from the configuration interface for the virtual circuit network further comprises:

receiving an Interim Local Management Interface (ILMI) message comprising a list of at least one of a plurality of Virtual Channel Identifiers or Virtual Path Identifiers (VCI/VPI) in the network.

4. A method as recited in claim 1, wherein the step of iteratively applying each identifier to individual instances of interface configuration commands until connectivity with the remote device is established further comprises:

iteratively incorporating successive virtual circuit identifiers from the list into dynamically constructed commands to configure an interface to the virtual circuit network and successively applying the commands to the interface.

5. A method as recited in claim 1, wherein the step of testing the virtual circuit corresponding to the identifier selected from the list for connectivity with the remote device further comprises the step of:

pinging the remote device, wherein the remote device comprises a configuration server.

6. A method as recited in claim 1, wherein the step of requesting the IP address of the second device terminating the virtual circuit further comprises:

forming an Inverse Address Resolution Protocol Request (IARP); and sending the IARP request to the second device terminating the virtual circuit.

7. A method as recited in claim 1, wherein the step of determining the IP address for the first device comprises the steps of:

determining a netmask for the first device, wherein the subnet for the first device is smaller than or equal to a subnet of the second device terminating the virtual circuit corresponding to the selected identifier; and determining the IP address for the first device valid in the subnet of the second device based upon the IP address of the second device terminating the virtual circuit.

8. A method as recited in claim 7, wherein one or more of the steps of determining the netmask for the first device and determining the IP address for the first device valid in the subnet of the second device further comprise the steps of:

selecting a proposed netmask for a proposed subnet of smallest available size;

testing if the IP address of the second device terminating the virtual circuit is valid within the proposed subnet;

if the IP address of the second device terminating the virtual circuit is valid within the proposed subnet, then performing the following steps:

adding 1 to the IP address of the second device terminating the virtual circuit to form a first result, and testing whether the first result is a valid address;

if the first result is a valid address, choosing the first result as the IP address for the first device, otherwise, subtracting 1 from the IP address of the second device terminating the virtual circuit to form a second result and choosing the second result as the IP address for the first device;

otherwise, increasing the size of the proposed subnet and iteratively performing the above steps beginning with the testing step.

9. A method as recited in claim 7, wherein one or more of the steps of determining the netmask for the first device and determining the IP address for the first device valid in the subnet of the second device further comprise the steps of:

determining a largest netmask less than or equal to 30 bits (255.255.255.252) such that ((ip_address_of_the_device_terminating_VC & ~netmask) !=0) && ((ip_address_of_the_device_terminating_the VC | netmask) !=~0) is true;

adding 1 to the IP address of the second device terminating the virtual circuit to form a first result, and testing whether the first result is a valid address;

if the first result is a valid address, choosing the first result as the IP address for the first device, otherwise, subtracting 1 from the IP address of the second device terminating the virtual circuit to form a second result and choosing the second result as the IP address for the first device.

10. A method as recited in claim 1, further comprising the step of:

automatically communicating an inventory of all interfaces associated with the first device to the remote device upon establishing connectivity with the remote device.

11. A computer-readable volatile or non-volatile storage medium storing one or more sequences of instructions for provisioning a first device operable with internet protocol (IP) in a virtual circuit network, which instructions, when executed by one or more processors, cause the one or more processors to carry out the steps of:

the first device requesting a list of identifiers corresponding to virtual circuits from a configuration interface for the virtual circuit network;

receiving the list of identifiers corresponding to virtual circuits from the configuration interface for the virtual circuit network; and iteratively applying each identifier to individual instances of interface configuration commands until connectivity with a remote device is established, comprising the steps of:

requesting, from a second device terminating the virtual circuit corresponding to an identifier selected from the list, an IP address of the second device;

wherein the second device terminating the virtual circuit is operable to provide connectivity to the remote device;

wherein the second device terminating the virtual circuit is operable to route messages that are destined to the remote device, and wherein the remote device is operable to provide configuration information to configure the first device;

receiving the IP address of the second device terminating the virtual circuit corresponding to the identifier selected from the list;

determining an IP address for the first device;
testing the virtual circuit corresponding to the identifier selected from the list for connectivity with the remote device; and
if the virtual circuit corresponding to the selected identifier provides connectivity to the remote device, then choosing the virtual circuit corresponding to the selected identifier for connecting to the remote device, otherwise, iteratively applying the above steps for a next identifier in the list until the list is exhausted.

12. A computer-readable volatile or non-volatile storage medium as recited in claim 11, wherein the virtual circuit network comprises a frame relay network, and wherein the instructions for carrying out the step of receiving the list of identifiers corresponding to virtual circuits from the configuration interface for the virtual circuit network further comprise instructions for carrying out the step of:
receiving a Local Management Interface (LMI) message comprising a list of at least one of a plurality of Data Link Connection Identifiers (DLCIs) in the network.

13. A computer-readable volatile or non-volatile storage medium as recited in claim 11, wherein the virtual circuit network comprises an Asynchronous Transfer Method (ATM) relay network, and wherein the instructions for carrying out the step of receiving the list of identifiers corresponding to virtual circuits from the configuration interface for the virtual circuit network further comprise instructions for carrying out the step of:
receiving an Interim Local Management Interface (ILMI) message comprising a list of at least one of a plurality of Virtual Channel Identifiers or Virtual Path Identifiers (VCI/VPI) in the network.

14. A computer-readable volatile or non-volatile storage medium as recited in claim 11, wherein the instructions for carrying out the step of iteratively applying each identifier to individual instances of interface configuration commands until connectivity with the remote device is established further comprise instructions for carrying out the step of:
iteratively incorporating successive virtual circuit identifiers from the list into dynamically constructed commands to configure an interface to the virtual circuit network and successively applying the commands to the interface.

15. A computer-readable volatile or non-volatile storage medium as recited in claim 11, wherein the instructions for carrying out the step of testing the virtual circuit corresponding to the identifier selected from the list for connectivity with the remote device further comprise instructions for carrying out the step of:
pinging the remote device, wherein the remote device comprises a configuration server.

16. A computer-readable volatile or non-volatile storage medium as recited in claim 11, wherein the instructions for carrying out the step of requesting the IP address of the second device terminating the virtual circuit comprises instructions for carrying out the steps of:
forming an Inverse Address Resolution Protocol Request (IARP); and
sending the IARP request to the second device terminating the virtual circuit.

17. A computer-readable volatile or non-volatile storage medium as recited in claim 11, wherein the instructions for carrying out the step of determining the IP address for the first device comprise instructions for carrying out the steps of:
determining a netmask for the first device, wherein the subnet for the first device is smaller than or equal to a subnet of the second device terminating the virtual circuit corresponding to the selected identifier; and
determining the IP address for the first device valid in the subnet of the second device based upon the IP address of the second device terminating the virtual circuit.

18. A computer-readable volatile or non-volatile storage medium as recited in claim 17, wherein the instructions for carrying out one or more of the steps of determining the netmask for the first device and determining the IP address for the first device valid in the subnet of the second device further comprise instructions for carrying out the steps of:
selecting a proposed netmask for a proposed subnet of smallest available size;
testing if the IP address of the second device terminating the virtual circuit is valid within the proposed subnet;
if the IP address of the second device terminating the virtual circuit is valid within the proposed subnet, then performing the following steps:
adding 1 to the IP address of the second device terminating the virtual circuit to form a first result, and testing whether the first result is a valid address;
if the first result is a valid address, choosing the first result as the IP address for the first device, otherwise, subtracting 1 from the IP address of the second device terminating the virtual circuit to form a second result and choosing the second result as the IP address for the first device;
otherwise, increasing the size of the proposed subnet and iteratively performing the above steps beginning with the testing step.

19. A computer-readable volatile or non-volatile storage medium as recited in claim 17, wherein the instructions for carrying out one or more of the steps of determining the IP address for the first device valid in the subnet of the second device and determining the netmask for the first device further comprise instructions for carrying out the steps of:
determining a largest netmask less than or equal to 30 bits (255.255.255.252) such that ((ip_address_of_the_device_terminating_VC & ~netmask) !=0) && ((ip_address_of_the_device_terminating_the VC | netmask) !=~0) is true;
adding 1 to the IP address of the second device terminating the virtual circuit to form a first result, and testing whether the first result is a valid address;
if the first result is a valid address, choosing the first result as the IP address for the first device, otherwise, subtracting 1 from the IP address of the second device terminating the virtual circuit to form a second result and choosing the second result is the IP address for the first device.

20. A computer-readable volatile or non-volatile storage medium as recited in claim 11, further comprising instructions, which, when executed by the one or more processors, cause the one or more processors to carry out the step of:
automatically communicating an inventory of all interfaces associated with the first device to the remote device upon establishing connectivity with the remote device.

21. An apparatus for provisioning a first device operable with internet protocol (IP) in a virtual circuit network, comprising:
in the first device, means for requesting a list of identifiers corresponding to virtual circuits from a configuration interface for the virtual circuit network;
means for receiving the list of identifiers corresponding to virtual circuits from the configuration interface for the virtual circuit network;

means for iteratively applying each identifier to individual instances of interface configuration commands until connectivity with a remote device is established, the means further comprising:
  means for requesting, from a second device terminating the virtual circuit corresponding to an identifier selected from the list, an IP address of the second device;
  wherein the second device terminating the virtual circuit is operable to provide connectivity to the remote device;
  wherein the second device terminating the virtual circuit is operable to route messages that are destined to the remote device, and wherein the remote device is operable to provide configuration information to configure the first device;
  means for receiving the IP address of the second device terminating the virtual circuit corresponding to the identifier selected from the list;
  means for determining an IP address for the first device for use with the virtual circuit corresponding to the selected identifier providing connectivity to the remote device;
  means for testing the virtual circuit corresponding to the identifier selected from the list for connectivity with the remote device.

22. An apparatus method as recited in claim 21, wherein the virtual circuit network comprises a frame relay network, and wherein the means for receiving the list of identifiers corresponding to virtual circuits from the configuration interface for the virtual circuit network further comprises:
  means for receiving a Local Management Interface (LMI) message comprising a list of at least one of a plurality of Data Link Connection Identifiers (DLCIs) in the network.

23. An apparatus as recited in claim 21, wherein the virtual circuit network comprises an Asynchronous Transfer Method (ATM) relay network, and wherein the means for receiving the list of identifiers corresponding to virtual circuits from the configuration interface for the virtual circuit network further comprises:
  means for receiving an Interim Local Management Interface (ILMI) message comprising a list of at least one of a plurality of Virtual Channel Identifiers or Virtual Path Identifiers (VCI/VPI) in the network.

24. An apparatus as recited in claim 21, wherein the means for iteratively applying each identifier to individual instances of interface configuration commands until connectivity with the remote device is established further comprises:
  means for iteratively incorporating successive virtual circuit identifiers from the list into dynamically constructed commands to configure an interface to the virtual circuit network and successively applying the commands to the interface.

25. An apparatus as recited in claim 21, wherein the means for testing the virtual circuit further comprises:
  means for pinging the remote device, wherein the remote device comprises a configuration server.

26. An apparatus as recited in claim 21, wherein the means for requesting the IP address of the second device terminating the virtual circuit further comprises:
  means for forming an Inverse Address Resolution Protocol Request (IARP); and
  means for sending the IARP request to the second device terminating the virtual circuit.

27. An apparatus as recited in claim 21, wherein the means for determining the IP address for the first device comprises:
  means for determining a netmask for the first device, wherein the subnet for the first device is smaller than or equal to a subnet of the second device terminating the virtual circuit corresponding to the selected identifier; and
  means for determining an IP address for the first device valid in the subnet of the second device based upon the IP address of the second device terminating the virtual circuit corresponding to the selected identifier.

28. An apparatus as recited in claim 21, wherein one or more of the means for determining the netmask for the first device and the means for determining the IP address for the first device valid in the subnet of the second device further comprise:
  means for selecting a proposed netmask for a proposed subnet of smallest available size;
  means for testing if the IP address of the second device terminating the virtual circuit is valid within the proposed subnet;
  means for adding 1 to the IP address of the second device terminating the virtual circuit to form a first result, if the IP address of second device terminating the virtual circuit is valid within the proposed subnet, and testing whether the first result is a valid address;
  means for choosing the first result as the IP address for the first device if the first result is a valid address, otherwise, subtracting 1 from the IP address of the second device terminating the virtual circuit to form a second result and choosing the second result as the IP address for the first device; and
  means for iteratively invoking the above means beginning with the means for testing.

29. An apparatus for provisioning a first device operable with internet protocol (IP) in a virtual circuit network, comprising:
  a network interface that is coupled to the virtual circuit network for receiving one or more packet flows via switched virtual circuits therefrom;
  a processor;
  one or more stored sequences of instructions which, when executed by the processor, cause the processor to carry out the steps of:
    the first device requesting a list of identifiers corresponding to virtual circuits from a configuration interface for the virtual circuit network;
    receiving the list of identifiers corresponding to virtual circuits from the configuration interface for the virtual circuit network; and
    iteratively applying each identifier to individual instances of interface configuration commands until connectivity with a remote device is established, comprising the steps of:
      requesting, from a second device terminating the virtual circuit corresponding to an identifier selected from the list, an IP address of the second device;
      wherein the second device terminating the virtual circuit is operable to provide connectivity to the remote device;
      wherein the second device terminating the virtual circuit is operable to route messages that are destined to the remote device, and wherein the remote device is operable to provide configuration information to configure the first device;
      receiving the IP address of the second device terminating the virtual circuit corresponding to the identifier selected from the list;
      determining an IP address for the first device;

testing the virtual circuit corresponding to the identifier selected from the list for connectivity with the remote device; and if the virtual circuit corresponding to the selected identifier provides connectivity to the remote device, then choosing the virtual circuit corresponding to the selected identifier for connecting to the remote device, otherwise, iteratively applying the above steps for a next identifier in the list until the list is exhausted.

30. An apparatus as recited in claim 29, wherein the virtual circuit network comprises a frame relay network, and wherein the instructions for carrying out the step of receiving the list of identifiers corresponding to virtual circuits from the configuration interface for the virtual circuit network further comprises instructions for carrying out the step of:

receiving a Local Management Interface (LMI) message comprising a list of at least one of a plurality of Data Link Connection Identifiers (DLCIs) in the network.

31. An apparatus as recited in claim 29, wherein the virtual circuit network comprises an Asynchronous Transfer Method (ATM) relay network, and wherein the instructions for carrying out the step of receiving the list of identifiers corresponding to virtual circuits from the configuration interface for the virtual circuit network further comprises instructions for carrying out the step of:

receiving an Interim Local Management Interface (ILMI) message comprising a list of at least one of a plurality of Virtual Channel Identifiers or Virtual Path Identifiers (VCI/VPI) in the network.

32. An apparatus as recited in claim 29, wherein the instructions for carrying out the step of iteratively applying each identifier to individual instances of interface configuration commands until connectivity with the remote device is established further comprises instructions for carrying out the step of:

iteratively incorporating successive virtual circuit identifiers from the list into dynamically constructed commands to configure an interface to the virtual circuit network and successively applying the commands to the interface.

33. An apparatus as recited in claim 29, wherein the instructions for carrying out the step of testing the virtual circuit corresponding to the identifier selected from the list for connectivity with the remote device further comprises instructions for carrying out the step of:

pinging the remote device, wherein the remote device comprises a configuration server.

34. An apparatus as recited in claim 29, wherein the instructions for carrying out the step of obtaining the IP address for the second device terminating the virtual circuit corresponding to the selected identifier, further comprises:

forming an Inverse Address Resolution Protocol Request (IARP); and sending the IARP request to the second device terminating the virtual circuit.

35. An apparatus as recited in claim 29, wherein the instructions for carrying out the step of determining the IP address for the first device comprises instructions for carrying out the steps of:

determining a netmask for the first device, wherein the subnet for the first device is smaller than or equal to a subnet of the second device terminating the virtual circuit; and determining the IP address for the first device valid in the subnet of the second device based upon the IP address of the second device terminating the virtual circuit.

36. An apparatus as recited in claim 35, wherein one or more of the instructions for carrying out the step of determining the netmask for the first device and the instructions for carrying out the step of determining the IP address for the first device valid in the subnet of the second device further comprise instructions for carrying out the steps of:

selecting a proposed netmask for a proposed subnet of smallest available size;

testing if the IP address for the second device terminating the virtual circuit is valid within the proposed subnet;

if the IP address for the second device terminating the virtual circuit is valid within the proposed subnet, then performing the following steps:

adding 1 to the IP address of the second device terminating the virtual circuit to form a first result, and testing whether the first result is a valid address;

if the first result is a valid address, choosing the first result as the IP address for the first device, otherwise, subtracting 1 from the IP address of the second device terminating the virtual circuit to form a second result and choosing the second result as the IP address of the first device, otherwise, increasing the size of the proposed subnet and iteratively performing the above steps beginning with the testing step.

37. An apparatus as recited in claim 35, wherein one or more of the instructions for carrying out the step of determining the netmask for the first device and the instructions for carrying out the step of determining the IP address for the first device valid in the subnet of the second device further comprise instructions for carrying out the steps of:

determining a largest netmask less than or equal to 30 bits (255.255.255.252) such that ((ip_address_of the_device_terminating_VC & ~netmask) !=0) && ((ip_address_of_the_device_terminating_the VC | netmask) !=~0) is true;

adding 1 to the IP address of the second device terminating the virtual circuit to form a first result, and testing whether the first result is a valid address;

if the first result is a valid address, choosing the first result as the IP address for the first device, otherwise, subtracting 1 from the IP address of the second device terminating the virtual circuit to form a second result and choosing the second result as the IP address of the first device.

38. An apparatus as recited in claim 29, further comprising instructions for carrying out the step of:

automatically communicating an inventory of all interfaces associated with the first device to the remote device upon establishing connectivity with the remote device.

* * * * *

UNITED STATES PATENT AND TRADEMARK OFFICE
CERTIFICATE OF CORRECTION

| | | |
|---|---|---|
| PATENT NO. | : 7,523,185 B1 | Page 1 of 1 |
| APPLICATION NO. | : 10/757809 | |
| DATED | : April 21, 2009 | |
| INVENTOR(S) | : John Ng | |

It is certified that error appears in the above-identified patent and that said Letters Patent is hereby corrected as shown below:

In column 36, line 41, in claim 37, delete "(ip_address_of the_device_terminating_VC & -netmask)" and insert -- (ip_address_of_the_device_terminating_VC & -netmask) --.

Signed and Sealed this
Twenty-sixth Day of July, 2011

David J. Kappos
*Director of the United States Patent and Trademark Office*